US009608462B2

(12) United States Patent
Ishibashi

(10) Patent No.: US 9,608,462 B2
(45) Date of Patent: Mar. 28, 2017

(54) CONTROL SYSTEM, CONTROL APPARATUS, AND CONTROL METHOD

(71) Applicant: SONY CORPORATION, Tokyo (JP)

(72) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 485 days.

(21) Appl. No.: 13/866,333

(22) Filed: Apr. 19, 2013

(65) Prior Publication Data
US 2013/0314031 A1 Nov. 28, 2013

(30) Foreign Application Priority Data

May 22, 2012 (JP) ................. 2012-116901

(51) Int. Cl.
H02J 7/00 (2006.01)
H02J 3/32 (2006.01)
H02J 3/38 (2006.01)
H02J 7/34 (2006.01)
H02J 7/35 (2006.01)

(52) U.S. Cl.
CPC .............. *H02J 7/0052* (2013.01); *H02J 3/32* (2013.01); *H02J 3/382* (2013.01); *H02J 3/385* (2013.01); *H02J 3/386* (2013.01); *H02J 7/34* (2013.01); *H02J 7/35* (2013.01); *Y02E 10/58* (2013.01); *Y02E 10/763* (2013.01); *Y02E 10/766* (2013.01); *Y02E 70/30* (2013.01); *Y02P 80/21* (2015.11)

(58) Field of Classification Search
USPC ....................................................... 320/101
See application file for complete search history.

(56) References Cited

U.S. PATENT DOCUMENTS

2009/0302681 A1* 12/2009 Yamada et al. ............... 320/101
2011/0193516 A1* 8/2011 Oohara et al. ............... 320/101
2011/0285345 A1* 11/2011 Kawai .................. B60L 11/1825
                                                              320/107
2012/0176095 A1* 7/2012 Okuda ................... H01M 10/44
                                                              320/134

FOREIGN PATENT DOCUMENTS

JP        2009-232668        10/2009

* cited by examiner

*Primary Examiner* — Robert Grant
(74) *Attorney, Agent, or Firm* — Paratus Law Group, PLLC

(57) ABSTRACT

There is provided a control system including a plurality of first apparatuses, and at least one second apparatus that is connected to each first apparatus. The first apparatuses include a plurality of conversion units, and each include a control unit controlling an on/off state of each conversion unit by referring to a table. The second apparatus includes a power storage unit and a charging control unit controlling charging of the power storage unit. The conversion units each convert a first voltage supplied from a power generating apparatus to a second voltage according to a magnitude of the first voltage. The second voltage output from at least one of the conversion units is supplied to the second apparatus. The charging control unit controls charging of the power storage unit in accordance with a variation in the second voltage.

11 Claims, 20 Drawing Sheets

FIG. 10
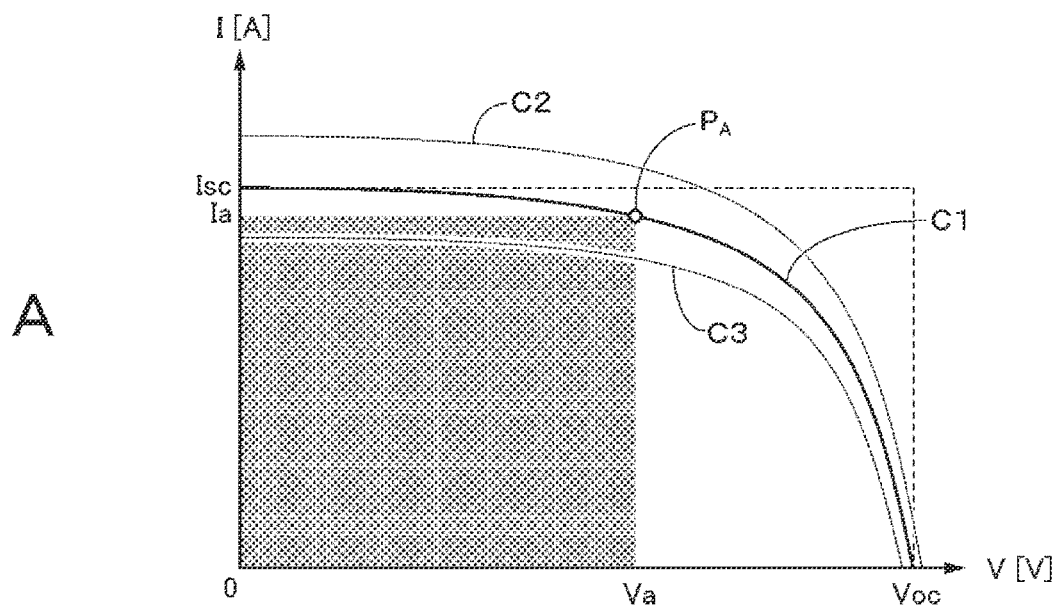
A
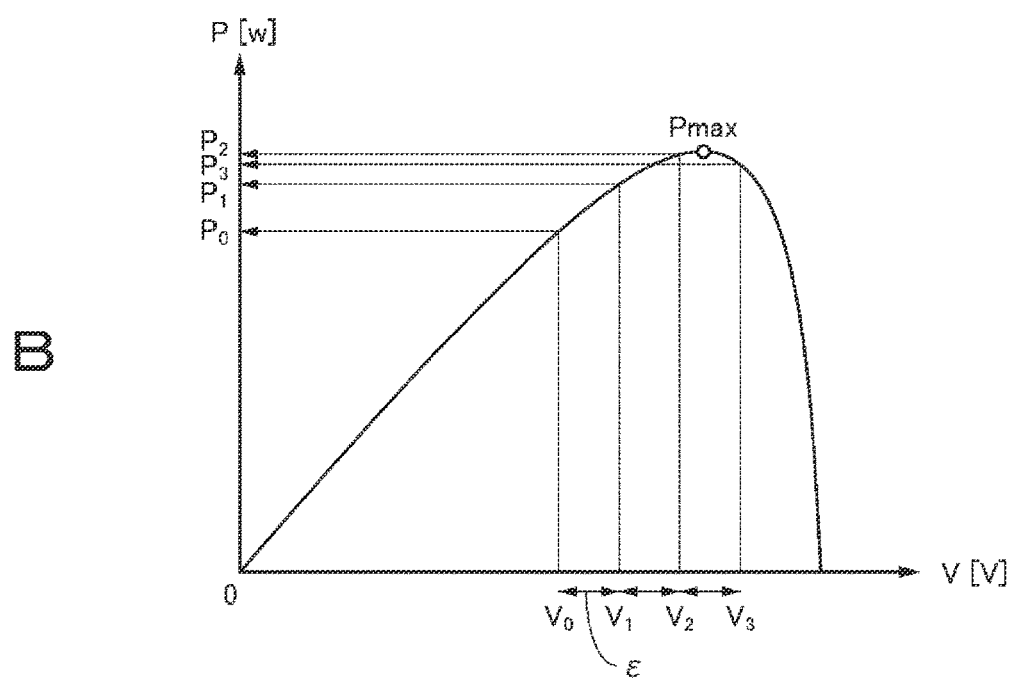
B

FIG. 12
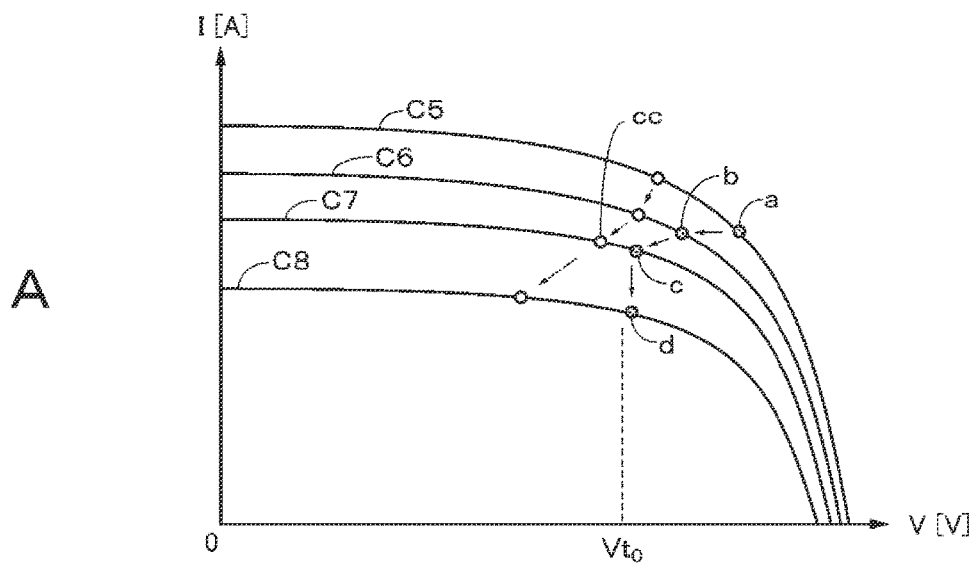
A
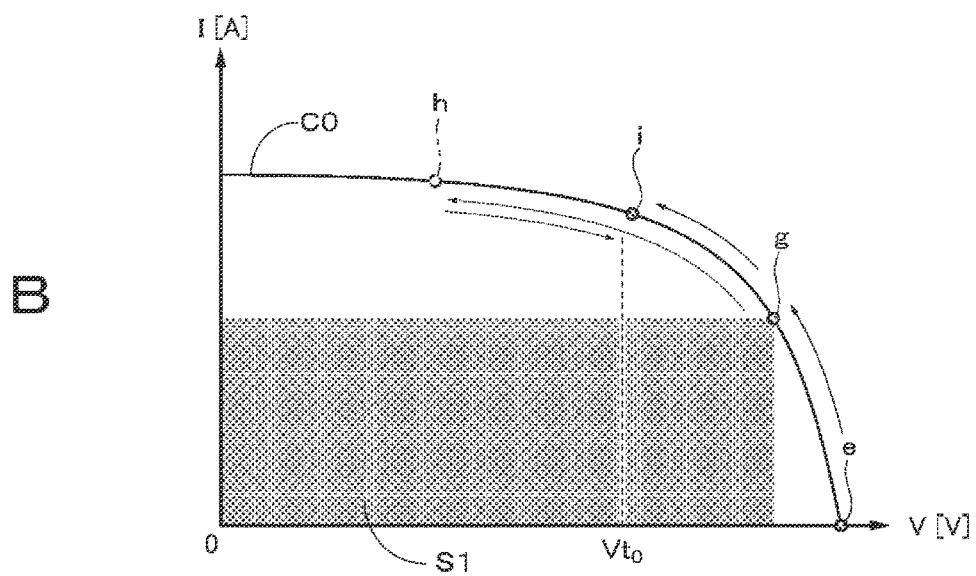
B

FIG. 19

CONTROL SYSTEM, CONTROL APPARATUS, AND CONTROL METHOD

BACKGROUND

The present disclosure relates to a control system, a control apparatus, and a control method.

Power obtained from renewable energy sources is used to charge batteries. Japanese Laid-Open Patent Publication No. 2009-232668 discloses a technology that charges a power storage unit using power generated by a solar power generating apparatus and/or a wind power generating apparatus.

SUMMARY

The technology disclosed in the cited publication only realizes control that switches the charging of a power storage unit on or off. Accordingly, it is not possible unfortunately to control charging in accordance with changes in the output of a solar power generating apparatus and/or a wind power generating apparatus.

Accordingly, it is desirable to provide a control system, a control apparatus, and a control method that control charging in accordance with changes in output of a solar power generating apparatus and/or a wind power generating apparatus.

According to an embodiment of the present disclosure, there is provided a control system including a plurality of first apparatuses, and at least one second apparatus that is connected to each of the plurality of first apparatuses. The plurality of first apparatuses include a plurality of conversion units, and each include a control unit controlling an on/off state of each of the plurality of conversion units by referring to a table. The at least one second apparatus includes a power storage unit and a charging control unit controlling charging of the power storage unit. The plurality of conversion units each convert a first voltage supplied from a power generating apparatus to a second voltage according to a magnitude of the first voltage. The second voltage output from at least one of the plurality of conversion units is supplied to the at least one second apparatus. The charging control unit controls charging of the power storage unit in accordance with a variation in the second voltage.

According to an embodiment of the present disclosure, there is provided a control apparatus including a plurality of conversion units, and a control unit controlling an on/off state of each of the conversion units. The control unit refers to a table in which an on/off period of each of the plurality of conversion units is written to control the on/off state of each of the plurality of conversion units. The conversion unit that is switched on by the control unit converts a first voltage supplied from a power generating apparatus to a second voltage according to a magnitude of the first voltage.

According to an embodiment of the present disclosure, there is provided a method for performing control in a control apparatus, the method including referring to a table in which an on/off period of a conversion unit is written to control an on/off state of the conversion unit through a control unit, and converting a first voltage supplied from a power generating apparatus to a second voltage according to a magnitude of the first voltage through the conversion unit that is switched on by the control unit.

As described above, according to embodiments of the present disclosure, it is possible to control charging in accordance with changes in output of a solar power generating apparatus and/or a wind power generating apparatus.

BRIEF DESCRIPTION OF THE DRAWINGS

FIG. 10A is a graph showing voltage-current characteristics of a solar cell and FIG. 10B is a graph (P-V curve) showing the relationship between the terminal voltage of a solar cell and the generated power of the solar cell for a case where the voltage-current characteristics of the solar cell are expressed by a given curve;

FIG. 12A is a graph useful in explaining changes in operating points when cooperative control is carried out in a case where insolation of a solar cell has decreased and FIG. 12B is a graph useful in explaining changes in operating points when cooperative control is carried out in a case where the load from the viewpoint of the solar cell has increased;

FIG. 18 is a diagram useful in explaining periods whether conversion units are actually on;

FIG. 19 is a diagram useful in explaining an example of schedule tables in which maximum numbers of conversion units to be switched on are written.

DETAILED DESCRIPTION OF THE EMBODIMENT(S)

Figure 1:
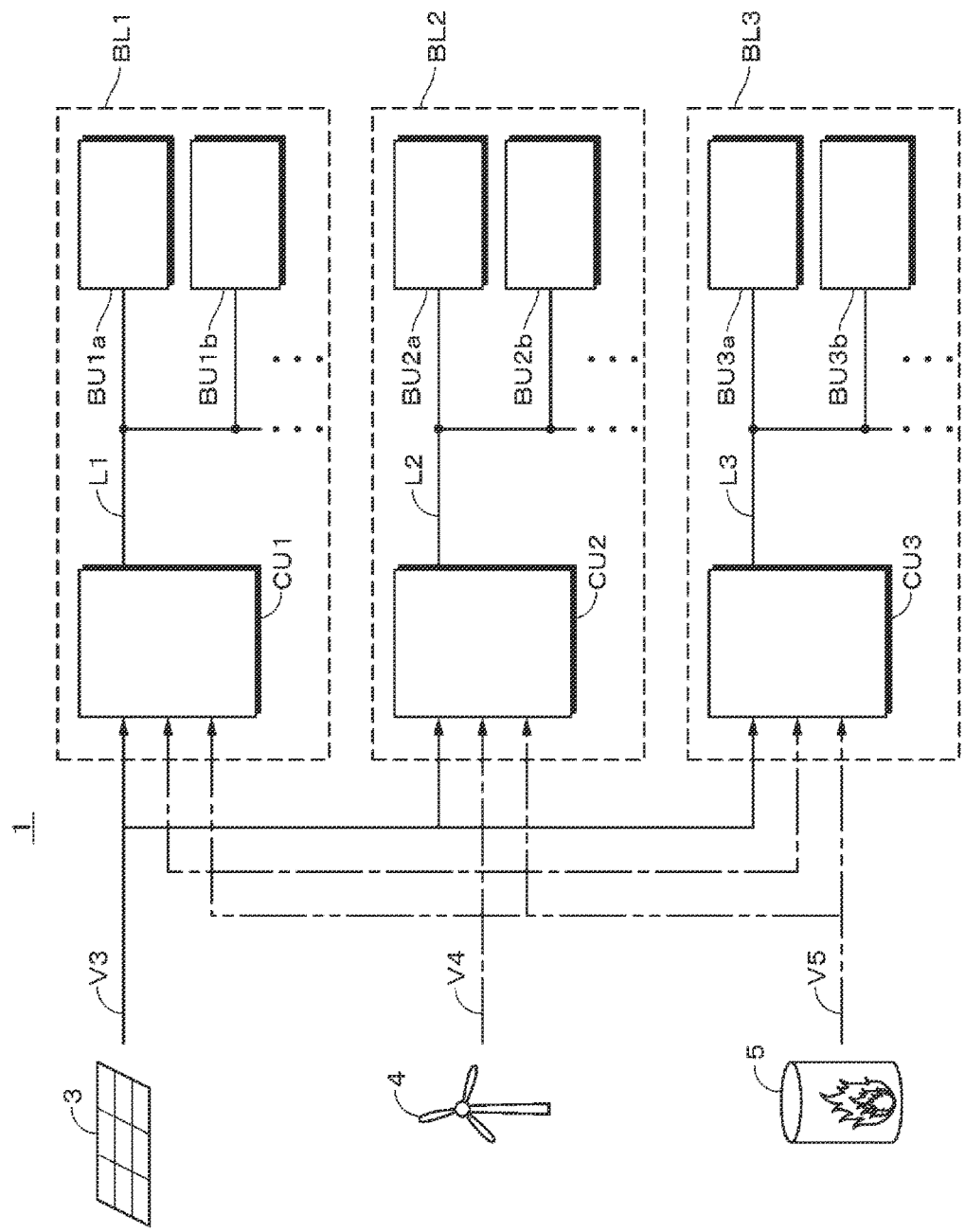
FIG. 1 is a block diagram showing an example configuration of a system.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.
1. First Embodiment
2. Second Embodiment
3. Third Embodiment
4. Modifications Note that the embodiments described below are preferred embodiments of the disclosure and that the present disclosure is not limited to such embodiments.

1. First Embodiment 1-1. System Configuration

FIG. 1 is a diagram showing one example configuration of a system according to a first embodiment of the present disclosure. As one example, the system 1 is supplied with the outputs of a plurality of power generating apparatuses. A solar power generating apparatus, a wind power generating apparatus, and a biomass power generating apparatus are illustrated as examples of such power generating apparatuses. In FIG. 1, a solar power generating apparatus 3 that uses photovoltaic panels is schematically shown. A wind power generating apparatus 4 that uses a rotor is also schematically shown. A biomass power generating apparatus 5 is also schematically shown as a tank and flames within the tank. The solar power generating apparatus 3 can be realized by a known solar power generating apparatus. Known apparatuses can also be used as the wind power generating apparatus 4 and the biomass power generating apparatus 5.

Here, a "power generating apparatus" generates power based on energy present in the surrounding environment, such as light, heat, vibrations, electromagnetic waves, a temperature difference, or a difference in ion concentration. A power generating apparatus may also be configured from the supplied power (i.e., the so-called "grid") or an apparatus that generates power using manpower. The plurality of power generating apparatuses may be power generating apparatuses of the same type.

DC (Direct Current) voltages obtained by the power generating apparatuses are supplied to blocks located downstream. If an AC (Alternating Current) voltage is obtained by a power generating apparatus, such AC voltage is converted to a DC voltage and then supplied to the downstream blocks. The system 1 includes a plurality of blocks. A block BL1, a block BL2, and a block BL3 are illustrated as the plurality of blocks. When it is not necessary to distinguish between the respective blocks, such blocks are collectively referred to as appropriate as "the blocks BL". Note that the expression "block" is used in the following description for ease of explanation only, and has no particular meaning. The configuration and the like of the blocks BL will be described later.

The blocks BL are connected in parallel to the respective power generating apparatuses. The DC voltage V3 supplied from the solar power generating apparatus 3 is supplied to the block BL1, the block BL2, and the block BL3. The DC voltage V4 supplied from the wind power generating apparatus 4 is supplied to the block BL1, the block BL2, and the block BL3. The DC voltage V5 supplied from the biomass power generating apparatus 5 is supplied to the block BL1, the block BL2, and the block BL3. The voltage V3, the voltage V4, and the voltage V5 are examples of "first voltages".

Although the values of the voltage V3, the voltage V4, and the voltage V5 may vary in accordance with the scale and the like of the respective apparatuses, the voltage V3, the voltage V4, and the voltage V5 are described here as voltages that vary within a range of 75V (volts) to 100V. In FIG. 1, the voltage V3 is shown by a solid line, the voltage V4 is shown by a dot-dash line, and the voltage V5 is shown by a dot-dot-dash line.

1.2. Configuration of Block

Block BL1 will now be described as one example of the configuration of the blocks BL. As one example, the block BL1 is configured so as to include one control unit and at least one battery unit. The control unit is one example of a "first apparatus" and the battery unit is one example of a "second apparatus".

As examples, a battery unit BU1a, a battery unit BU1b, and a battery unit BU1c are connected to a control unit CU1. When it is not necessary to distinguish between the respective battery units, such units are collectively referred to as appropriate as the "battery units BU1". In FIG. 1, the battery unit BU1a and the battery unit BU1b are shown.

The control unit CU1 is equipped with a plurality of ports, for example, with the battery units BU1 being detachably attached to such ports. That is, the number of battery units BU1 connected to the control unit CU1 can be changed as appropriate. As one example, in a state where the battery unit BU1a, the battery unit BU1b, and the battery unit BU1c are connected to the control unit CU1, it is possible, to connect a new battery unit to the control unit CU1. As another example, in a state where the battery unit BU1a, the battery unit BU1b and the battery unit BU1c are connected to the control unit CU1, it is also possible to detach the battery unit BU1b from the control unit CU1.

Figure 2:
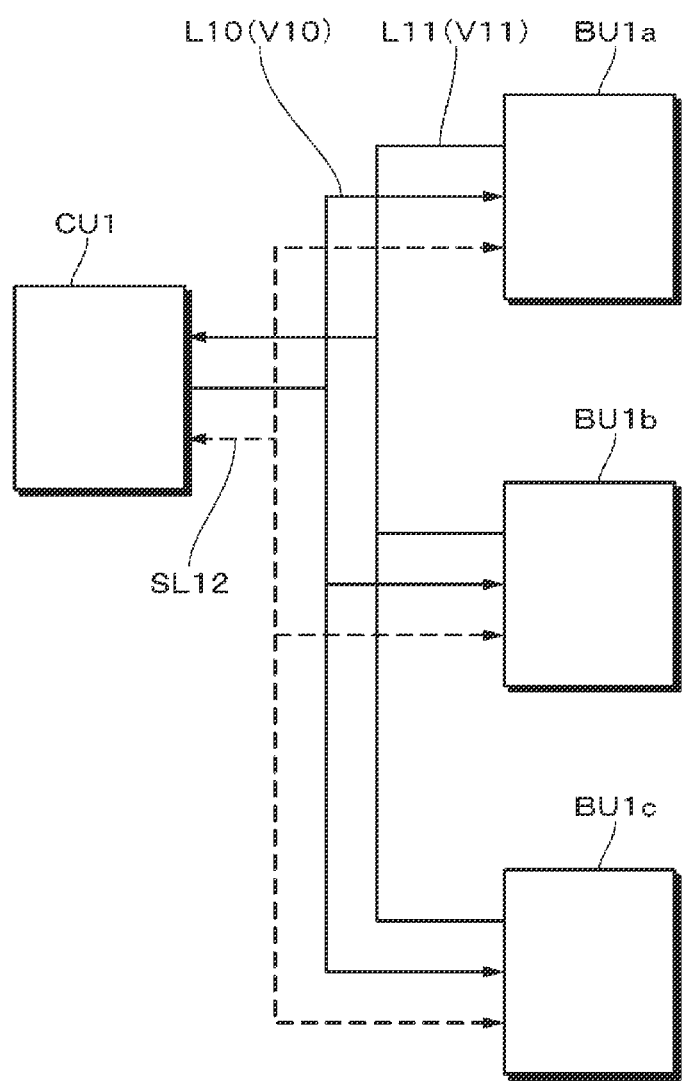
FIG. 2 is a diagram showing one example of connections between a control unit and battery units.

The battery units BU1 are connected to the control unit CU1 via lines L1. As shown in FIG. 2, as one example the lines L1 include power lines L10 on which power is transferred from the control unit CU1 to the battery units BU1 and power lines L11 on which power is transferred from the battery units BU1 to the control unit CU1. The lines L1 also include signal lines SL12 for communication conducted between the control unit CU1 and the respective battery units BU1.

Note that although a case where the transferring of power and communication are carried out via wired connections is described in the following explanation, the transferring of power and communication may be carried out wirelessly. In such case, it is unnecessary to provide the lines L1 as physical lines.

The DC voltage V10 is supplied via the power lines L10 from the control unit CU1 to the battery units BU1. Charging of a battery unit or units BU1 indicated for charging out of the plurality of battery units BU1 is then carried out based on the voltage V10. Charging of one battery unit BU1 may be carried out, or charging of a plurality of battery units BU1 may be carried out.

Charging is not carried out for a battery unit BU1 that is presently being discharged. A DC voltage V11 is output from a battery unit BU1 to which an instruction for discharging has been issued. As one example, the DC voltage V11 is supplied via the control unit CU1 to an external appliance that is a load. The voltage V11 may be supplied directly to the external appliance without passing the control unit CU1.

As examples, communication between the control unit CU1 and the respective battery units BU1 is carried out based on a specification such as SMBus (System Management Bus) or UART (Universal Asynchronous Receiver-Transmitter). The signal lines SL12 are lines that are shared between the battery units BU1 and are used to transfer control commands. As one example, a control command is transmitted from the control unit CU1 to a predetermined battery unit BU1.

The individual battery units BU1 can be independently controlled via the control commands. Each battery unit BU1 can be identified by the port number of the port to which such battery unit BU1 is connected. As one example, an identifier showing a port number is written in the header of a control command. By analyzing the header of a control command, each battery unit BU1 can identify whether a control command applies to such battery unit BU1.

In addition, through communication, each battery unit BU1 can inform the control unit CU1 of information on such battery unit BU1. As one example, through such communication a battery unit BU1 can inform the control unit CU1 of a (remaining) battery level of the battery included in the battery unit BU1. An identifier showing the port number is written in the header of a notification signal sent from a battery unit BU1 to the control unit CU1. By doing so, the control unit CU1 is capable of identifying the battery unit BU1 to which the notification signal relates.

An example of conceivable usage of the plurality of battery units BU1 will now be described. A control command that issues an instruction for charging is transferred from the control unit CU1 to the battery unit BU1$a$, and control is carried out to charge the battery unit BU1$a$. A control command that issues an instruction for discharging is transferred from the control unit CU1 to the battery unit BU1$b$, and control is carried out to discharge the battery unit BU1$a$. The battery unit BU1$c$ is used as a spare power supply. As one example, when the battery level of the battery unit BU1$b$ has fallen, the battery unit in use is switched from the battery unit BU1$b$ to the battery unit BU1$c$. The above is merely one example of usage and the present disclosure is not limited to such.

As one example, the configuration of the block BL2 is the same as the configuration of the block BL1. The block BL2 is configured so as to include a control unit CU2. As one example, a battery unit BU2$a$, a battery unit BU2$b$, and a battery unit BU2$c$ are connected via the lines L2 to the control unit CU2. In FIG. 1, the battery unit BU2$a$ and the battery unit BU2$b$ are shown.

As one example, the lines L2 include power lines L20 on which power is transferred from the control unit CU1 to the battery units BU2 and power lines L21 on which power is transferred from the battery units BU2 to the control unit CU1. The lines L2 also include signal lines SL22 for communication conducted between the control unit CU2 and the respective battery units BU2.

As one example, the configuration of the block BL3 is the same as the configuration of the block BL1. The block BL3 is configured so as to include a control unit CU3. As one example, a battery unit BU3$a$, a battery unit BU3$b$, and a battery unit BU3$c$ are connected via the lines L3 to the control unit CU3. In FIG. 1, the battery unit BU3$a$ and the battery unit BU3$b$ are shown.

As one example, the lines L3 include power lines L30 on which power is transferred from the control unit CU3 to the battery units BU3 and power lines L31 on which power is transferred from the battery units BU3 to the control unit CU3. The lines L3 also include signal lines SL32 for communication conducted between the control unit CU3 and the respective battery units BU3.

Note that the configurations of the respective blocks BL may differ within a range that is consistent with the other description relating to the present disclosure. Although there are cases in the following description where the same configurations are indicated and duplicated description is omitted, differences in configuration may still exist within a range that is consistent with the other description relating to the present disclosure.

1-3. Configuration of Control Unit

Figure 3:
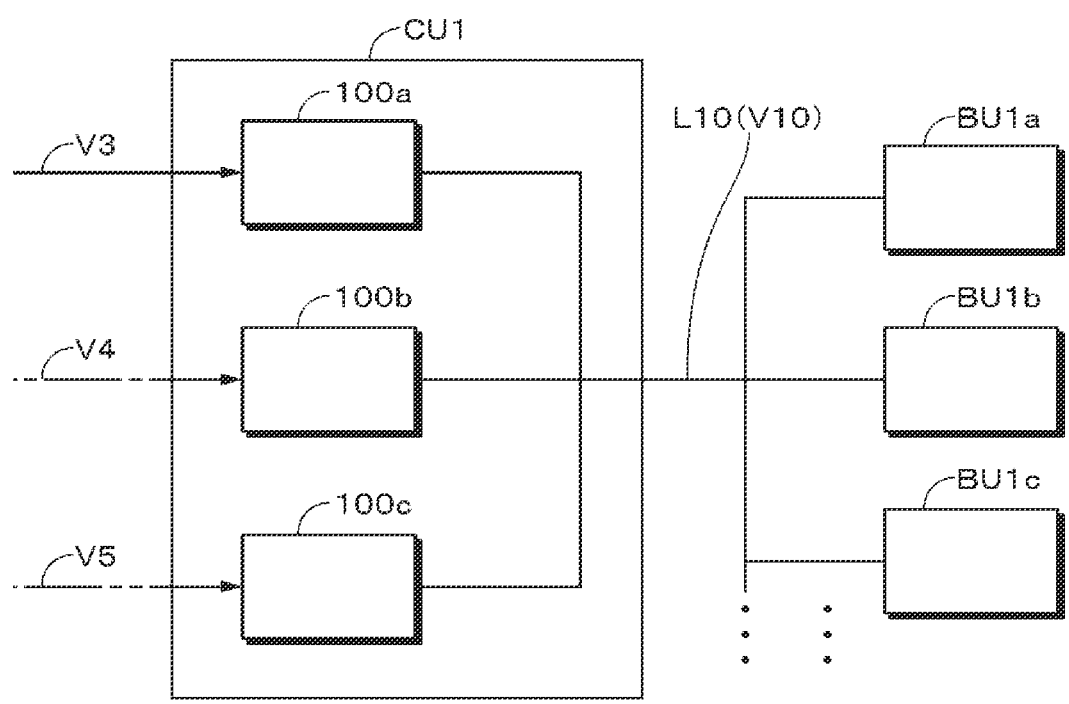
FIG. 3 is a diagram useful in explaining the configuration of the control unit.

FIG. 3 shows one example of the overall configuration of the control unit CU1. The control unit CU1 includes a conversion unit 100$a$, a conversion unit 100$b$, and a conversion unit 100$c$. When it is not necessary to distinguish between the individual conversion units, such units are referred to as appropriate as the "conversion unit 100". The voltage V3 that is the output voltage of the solar power generating apparatus 3 is supplied to the conversion unit 100$a$. The conversion unit 100$a$ converts the voltage V3 to a voltage V10 in keeping with the magnitude of the voltage V3. As described earlier, the voltage V3 is a voltage that varies within a range of 75V to 100V, for example. The voltage V10 is a DC voltage that varies within a range of 45V to 48V, for example.

When the voltage V3 is 75V, the conversion unit 100$a$ converts the voltage V3 so that the voltage V10 becomes 45V. When the voltage V3 is 100V, the conversion unit 100$a$ converts the voltage V3 so that the voltage V10 becomes 48V In keeping with the voltage V3 changing in a range of 75V to 100V the conversion unit 100$a$ converts the voltage V3 to the voltage V10 in a range where the voltage V10 changes substantially linearly in a range of 45V to 48V. Instead of having the conversion ratio change linearly, it is also possible to use various types of feedback circuit. The output obtained by such feedback circuit may be output from the conversion unit 100$a$.

The conversion unit 100$b$ and the conversion unit 100$c$ operate in the same way as the conversion unit 100$a$. When the voltage V4 is 75V, the conversion unit 100$b$ converts the voltage V4 so that the voltage V10 becomes 45V. When the voltage V4 is 100V the conversion unit 100$b$ converts the voltage V4 so that the voltage V10 becomes 48V. In keeping with the voltage V4 changing in a range of 75V to 100V the conversion unit 100$b$ converts the voltage V4 to the voltage V10 in a range where the voltage V10 changes substantially linearly in a range of 45V to 48V. Note that if the voltage V4 changes in a range of 200V to 420V, for example, the conversion unit 100$b$ lowers the voltage V4 to generate the voltage V10 in a range of 45V to 48V. In this way, the respective conversion units 100 are configured so as to operate as appropriate in keeping with the input voltage.

When the voltage V5 is 75V, the conversion unit 100$c$ converts the voltage V5 so that the voltage V10 becomes 45V. When the voltage V5 is 100V, the conversion unit 100$c$ converts the voltage V5 so that the voltage V10 becomes 48V. In keeping with the voltage V5 changing in a range of 75V to 100V, the conversion unit 100$c$ converts the voltage V5 to the voltage V10 in a range where the voltage V10 changes substantially linearly in a range of 45V to 48V. Note that if the voltage V5 changes in a range from 10V to 40V, for example, the conversion unit 100$c$ raises the voltage V5 to generate the voltage V10 in a range of 45V to 48V. In this way, the respective conversion units 100 are configured so as to operate as appropriate in keeping with the input voltage.

The conversion unit 100$a$, the conversion unit 100$b$ and the conversion unit 100$c$ output the respective voltages V10 and one out of such outputs is supplied via the power lines L10 to the battery units BU1. As one example, the largest voltage V10 is supplied via the power lines L10 to the battery unit BU1. If power consumption at the battery units BU1 is high, in some cases the outputs from the plurality of conversion units may be combined and supplied to the battery units BU1.

Note that it is also possible to select an output to be supplied to the battery units BU1 out of the plurality of outputs from the plurality of conversion units 100. Although described in detail later, the conversion unit 100a, the conversion unit 100b, and the conversion unit 100c may be respectively provided with variable resistors (volume controls), for example. By appropriately setting the values of the variable resistors, it is possible to supply the voltage V10 output from a predetermined conversion unit 100 to the battery units BU1.

Figure 4:
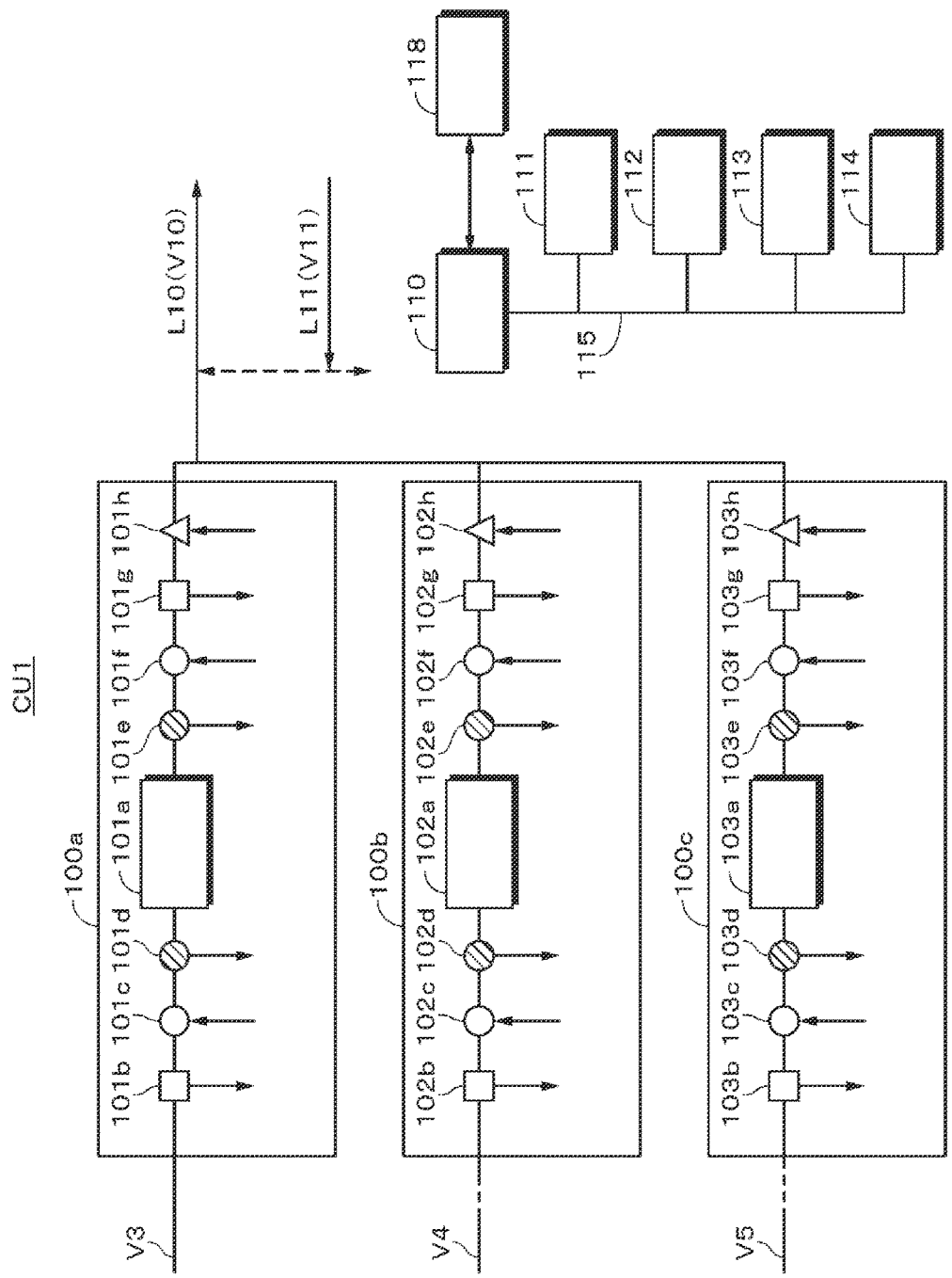
FIG. 4 is a diagram useful in explaining the configuration of a control unit.

FIG. 4 shows one example of the configuration of the control unit CU1. The conversion unit 100a of the control unit CU1 includes a DC-DC convertor 101a that converts (lowers) the voltage V3 to the voltage V10. If the voltage V3 is lower than 45V, for example, the DC-DC convertor 101a is configured as a boost-type DC-DC convertor. A known configuration can be used as the configuration of the DC-DC convertor 101a. Note that if an AC voltage is supplied as the voltage V3, an AC-DC convertor may be provided before the DC-DC convertor 101a.

Figure 7:
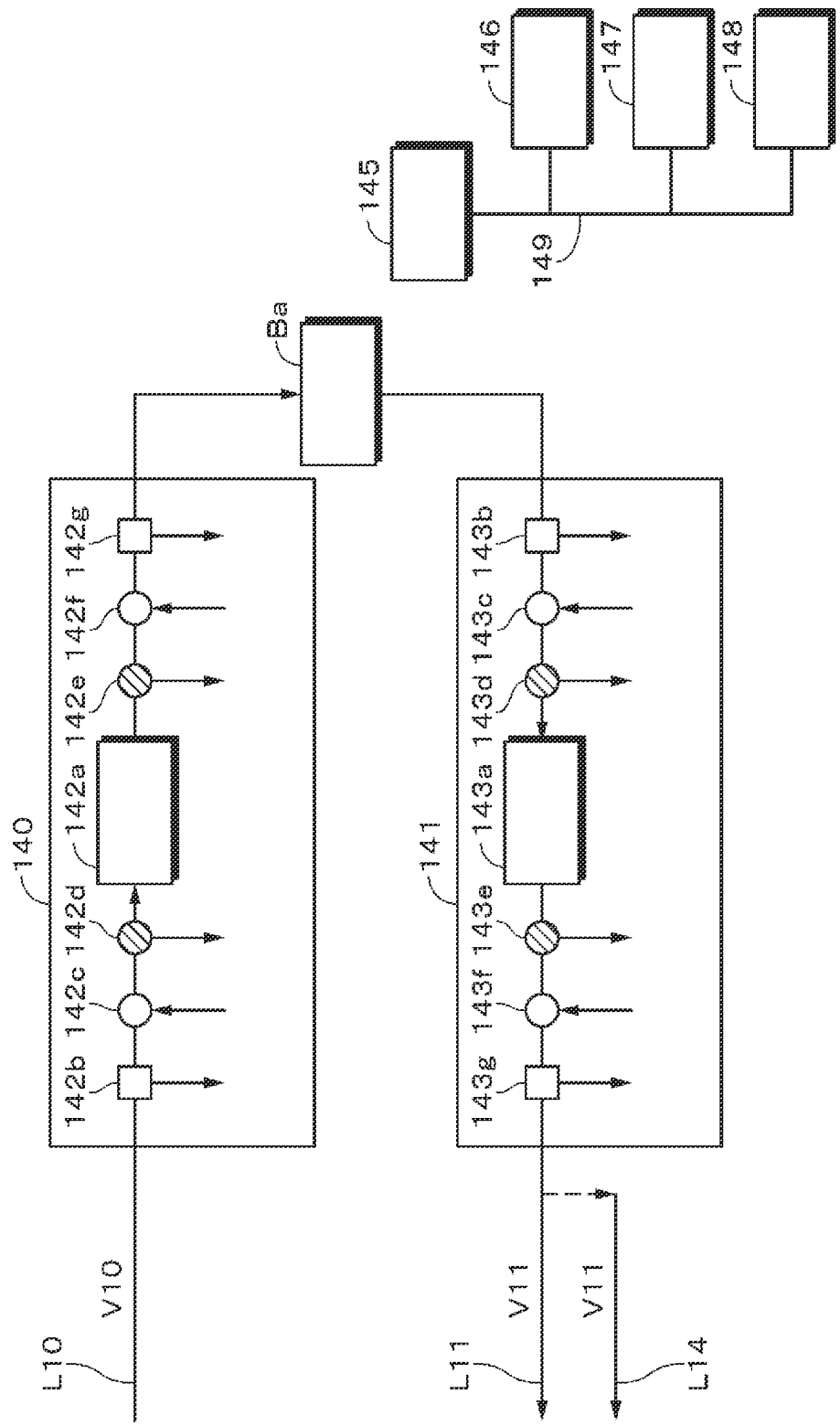
FIG. 7 is a diagram useful in explaining the configuration of a battery unit.

A voltage sensor, an electronic switch, and a current sensor are connected to each of the input stage and the output stage of the DC-DC convertor 101a. A variable resistor is also connected to the output stage of the DC-DC convertor 101a. In FIG. 4 and FIG. 7, described later, voltage sensors are simply depicted as rectangular marks, electronic switches are depicted as circular marks, current sensors are depicted as circular marks with diagonal shading, and variable resistors are depicted as triangular marks.

A voltage sensor 101b, an electronic switch 101c, and a current sensor 101d are connected in that order to an input stage of the DC-DC convertor 101a. A current sensor 101e, an electronic switch 101f, a current sensor 101g, and a variable resistor 101h are connected in that order to an output stage of the DC-DC convertor 101a.

The conversion unit 100b and the conversion unit 100c have the same configuration as the conversion unit 100a, for example. The conversion unit 100b includes a DC-DC convertor 102a. A voltage sensor 102b, an electronic switch 102c, and a current sensor 102d are connected in that order to an input stage of the DC-DC convertor 102a. A current sensor 102e, an electronic switch 102f, a current sensor 102g, and a variable resistor 102h are connected in that order to an output stage of the DC-DC convertor 102a.

The conversion unit 100c includes a DC-DC convertor 103a. A voltage sensor 103b, an electronic switch 103c, and a current sensor 103d are connected in that order to an input stage of the DC-DC convertor 103a. A current sensor 103e, an electronic switch 103f, a current sensor 103g, and a variable resistor 103h are connected in that order to an output stage of the DC-DC convertor 103a. By switching off the electronic switches of the respective conversion units 100, it is possible to stop the output of the conversion unit 100. As one example, by switching off at least one of the electronic switch 101c and the electronic switch 101f, it is possible to stop the output from the conversion unit 100a.

In place of control of the electronic switches, it is possible to adjust the resistance vales of the variable resistor 101h, the variable resistor 102h, and the variable resistor 103h. By adjusting the resistance values of the variable resistors, it is possible to apply limits to the outputs of the DC-DC convertor 101a and the like. As one example, the resistance value of the variable resistor 101h is set at zero or substantially zero, and the resistance values of the variable resistor 102h and the variable resistor 103h are set at predetermined values.

The output voltage of the DC-DC convertor 102a is lowered by the variable resistor 102h and the output voltage of the DC-DC convertor 103a is lowered by the variable resistor 103h. The voltage V10 output from the conversion unit 100a, which is the largest voltage, is supplied to the power lines L10 so that the voltage V10 is supplied to the battery units BU1. In this way, by appropriately adjusting the resistance values of the three variable resistors (the variable resistor 101h, the variable resistor 102h, and the variable resistor 103h), it is possible to select one output out of the outputs of the three conversion units (the conversion unit 100a, the conversion unit 100b, and the conversion unit 100c).

The control unit CU1 further includes a CPU (Central Processing Unit) 110. A memory 111, a D/A (Digital to Analog) conversion unit 112, an A/D (Analog to Digital) conversion unit 113, and a temperature sensor 114 are connected via a bus 115 to the CPU 110. The bus 115 includes an I2C bus, for example.

The CPU 110 controls the respective parts of the control unit CU1. As one example by carrying out on/off control of the electronic switches of the conversion units 100, the CPU 110 carries out control in keeping with sensor information supplied from the voltage sensors and/or current sensors of the conversion units 100.

Note that the arrows that extend from the marks showing the voltage sensors and the current sensors show how sensor information obtained by the sensors is supplied to the CPU 110 via the A/D conversion unit 113. In addition, the arrows that point toward the marks showing the electronic switches and the variable resistors show that control of the electronic switches and the variable resistors is carried out by the CPU 110.

The CPU 110 also carries out control over the battery units BU1 connected to the control unit CU1. As examples, the CPU 110 generates a control command that switches on the power supply of a predetermined battery unit BU1 or a control command that issues an instruction for charging or discharging of a predetermined battery unit BU1. The CPU 110 then transmits the generated control command to the signal lines SL12. In addition, the CPU 110 acquires information transmitted from the respective battery units BU1 (for example, the battery levels of the batteries in the battery units BU1) and carries out control in keeping with the acquired information.

The "memory 111" is the collective name for memories such as a ROM (Read Only Memory) that stores programs to be executed by the CPU 110, a RAM (Random Access Memory) used as a work memory when the CPU 110 carries out processing, and a nonvolatile memory such as an EEPROM (Electrically Erasable and Programmable Read Only Memory) in which various data (for example, the schedule table described later) is stored.

The D/A conversion unit 112 converts digital data to analog data. The A/D conversion unit 113 converts analog data to digital data. As one example, the A/D conversion unit 113 is supplied with sensor information in the form of analog data from the voltage sensors and/or the current sensors. The A/D conversion unit 113 converts the sensor information in the form of analog data to sensor information in the form of digital data. The sensor information in the form of digital data is supplied to the CPU 110.

The temperature sensor 114 measures the environmental temperature. As one example, the temperature sensor 114 measures the temperature inside the control unit CU1 and/or the temperature of the periphery of the control unit CU1. The temperature information obtained by the temperature sensor 114 is converted to digital data by the A/D conversion unit 113 and then supplied to the CPU 110.

Communication between the control unit CU1 and other appliances may also be carried out. As one example, the CPU 110 may be configured so as to include a communication function so that communication can be carried out between the CPU 110 and another appliance 118. A personal computer (PC), a tablet computer, and an appliance such as a smart lone can be given as examples of the other appliance 118.

Such communication may be communication via the Internet or may be short-range wireless communication. Although infrared communication, communication according to Zigbee (registered trademark) standard, communication according to Bluetooth (registered trademark) standard, and communication according to WiFi (registered trademark) which facilitates network formation can be given as examples of short-range wireless communication, the wireless communication carried out here is not limited to such.

Figure 5:
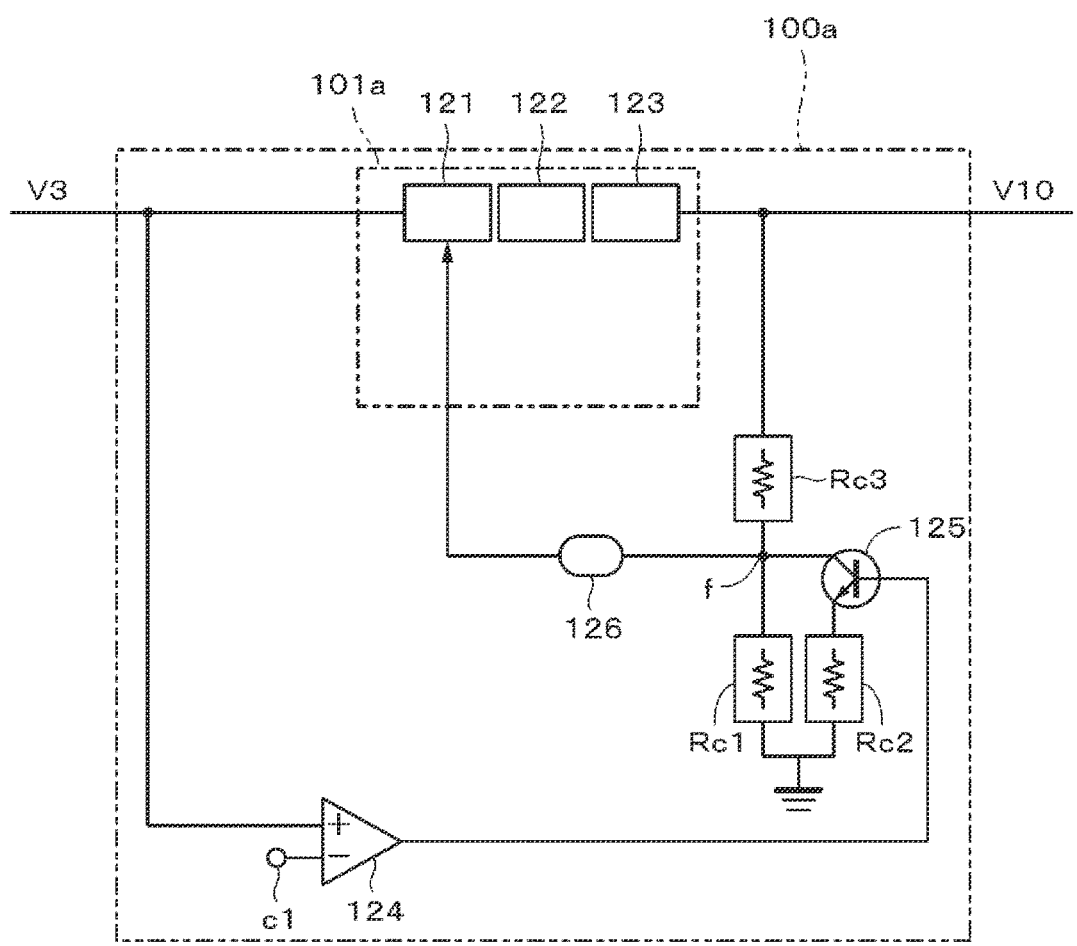
FIG. 5 is a diagram useful in explaining the detailed configuration of a conversion unit.

FIG. 5 shows one example of a detailed example configuration of the conversion unit 100a. As shown in FIG. 5, the conversion unit 100a includes the DC-DC convertor 101a and a feed forward control system, described later. In FIG. 5, the voltage sensor 101b, the electronic switch 101c, the current sensor 101d, the current sensor 101e, the electronic switch 101f, the voltage sensor 101g, and the variable resistor 101h are not illustrated.

As one example, the DC-DC convertor 101a includes a primary circuit 121 including a switching element and the like, a transformer 122, and a secondary circuit 123 including a rectifier element and the like. The DC-DC convertor 101a shown in FIG. 5 is a current resonance-type convertor (LLC Resonant Converter), for example.

The feed forward control system includes an operational amplifier 124, a transistor 125, a resistor Rc1, a resistor Rc2, and a resistor Rc3, and as one example the output of the feed forward control system is input into a control terminal provided in a driver of the primary circuit 121 of the DC-DC convertor 101a. The DC-DC convertor 101a adjusts the output voltage from the conversion unit 100a so that the input voltage into the control terminal is constant.

By equipping the conversion unit 100a with the feed forward control system, the value of the voltage V10 that is the output voltage from the conversion unit 100a is adjusted to become a voltage within a range set in advance. Accordingly, the control unit CU1 equipped with the conversion unit 100a has a function as a voltage conversion apparatus that changes the output voltage (the voltage V10) in accordance with changes in the input voltage (voltage V3) from the solar power generating apparatus 3, for example.

As shown in FIG. 5, an output voltage is taken from the conversion unit 100a via the primary circuit 121, the transformer 122, and the secondary circuit 123. The output from the control unit CU1 is transmitted via the power lines L10 to the battery units BU1. Note that if the voltage V3 is an AC voltage, an AC-DC converter is connected before the primary circuit 121. The AC-DC converter is a power factor correction circuit, for example.

The feed forward control system included in the conversion unit 100a will now be described.

A voltage that is kc times (where kc is several tens to one hundred or so) the input voltage (the voltage V3) into the conversion unit 100a is input into the non-inverting input terminal of the operational amplifier 124. Meanwhile, a voltage that is kc times a constant voltage Vt0 that is set in advance is input into the inverting input terminal c1 of the operational amplifier 124. The input voltage (kc×Vt0) into the inverting input terminal c1 of the operational amplifier 124 is applied from the D/A conversion unit 112, for example. The value of the voltage Vt0 is stored in an internal memory of the D/A conversion unit 112, for example, and the value of the voltage Vt0 can be changed as necessary. The value of the voltage Vt0 may be stored via the bus 115 in the memory 111 connected to the CPU 110 and transferred to the D/A conversion unit 112. The value of the voltage Vt0 may be a fixed value.

The output terminal of the operational amplifier 124 is connected to the base of the transistor 125 so that a voltage to current conversion is carried out by the transistor 125 in accordance with the difference between the input voltage into the non-inverting input terminal of the operational amplifier 124 and the input voltage into the inverting input terminal.

The resistance value of the resistor Rc2 connected to the emitter of the transistor 125 is set so as to have a large value compared to the resistance value of the resistor Rc2 connected in parallel to the resistor Rc1.

For example, assume that the input voltage into the conversion unit 100a is a voltage that is sufficiently higher than the constant voltage Vt0 set in advance. At this time, since the transistor 125 is on and the value of the combined resistance of the resistor Rc1 and the resistor Rc2 is smaller than the resistance value of the resistor Rc1, the potential at the f point shown in FIG. 5 approaches the ground potential.

When this happens, the input voltage into the control terminal provided in the driver of the primary circuit 121 connected via a photocoupler 126 is lowered. The DC-DC convertor 101a that has detected a drop in the input voltage into the control terminal pulls up the output voltage from the conversion unit, 100a so that the input voltage into the control terminal is constant.

Conversely, assume for example that the terminal voltage of a solar cell connected to the control unit CU1 has fallen and the input voltage into the conversion unit 100a has approached the constant voltage Vt0 set in advance.

When the input voltage into the conversion unit 100a has fallen, the state of the transistor 125 approaches the off state from the on state. As the state of the transistor 125 approaches the off state from the on state, it becomes difficult for a current to flow in the resistor Rc1 and the resistor Rc2 and the potential at the point f shown in FIG. 5 rises.

Since the input voltage into the control terminal provided in the driver of the primary circuit 121 is not capable of being kept constant, the DC-DC convertor 101a pulls down the output voltage from the conversion unit 100a, so that the input voltage into the control terminal becomes constant.

That is, if the input voltage is a voltage that is sufficiently higher than the constant voltage Vt0 set in advance, the conversion unit 100a pulls up the output voltage. If the terminal voltage of the solar cell falls and the input voltage approaches the constant voltage Vt0 set in advance, the conversion unit 100a pulls down the output voltage. In this way, the control unit CU1 equipped with the conversion unit 100a dynamically changes the output voltage in accordance with the magnitude of the input voltage.

In addition, as described later, the conversion unit 100a dynamically changes the output voltage in response to changes in voltage that are necessary on the output side of the control unit CU1.

As one example, assume that the number of battery units BU1 that are electrically connected to the control unit CU1 and are to be charged has increased during power generation by the solar power generating apparatus 3. That is, the load from the viewpoint of the solar power generating apparatus 3 has increased.

In this case, due to a battery unit BU1 being newly electrically connected to the control unit CU1, the terminal voltage of the solar cell connected to the control unit CU1 will fall. When this happens, in keeping with the fall in the input voltage into the conversion unit 100a, the state of the transistor 125 approaches the off state from the on state and the output voltage from the conversion unit 100a is pulled down.

Meanwhile, as another example, it during power generation by the solar power generating apparatus 3, the number of battery units BU1 that are electrically connected to the control unit CU1 and are to be charged decreases, the load from the viewpoint of the solar power generating apparatus 3 will decrease and the terminal voltage of the solar cell connected to the control unit CU1 will increase. If the input voltage into the conversion unit 100a is a voltage that is sufficiently higher than the constant voltage Vt0 that is set in advance, the input voltage into the control terminal provided in the driver of the primary circuit 121 falls and the output voltage from the conversion unit 100a is pulled up.

Note that the resistance values of the resistor Rc1, the resistor Rc2, and the resistor Rc3 are appropriately selected so that the value of the output voltage from the conversion unit 100a is a voltage value within a range set in advance. That is, the upper limit on the output voltage from the conversion unit 100a is decided by the resistance values of the resistors Rc1 and Rc2. The transistor 125 is disposed so that if the input voltage into the conversion unit 100a exceeds a predetermined value, the value of the output voltage from the conversion unit 100a will not exceed an upper limit voltage value set in advance.

Meanwhile, as described later, the lower limit of the output voltage from the conversion unit 100a is decided by the input voltage into an inverting input terminal of an operational amplifier in a feed forward control system in a charging control unit of a battery unit BU1.

As one example, the configurations of the conversion unit 100b and the conversion unit 100c are the same as the configuration of the conversion unit 100a. The conversion unit 100b and the conversion unit 100c may also operate in the same way as the conversion unit 100a, for example.

Figure 6:
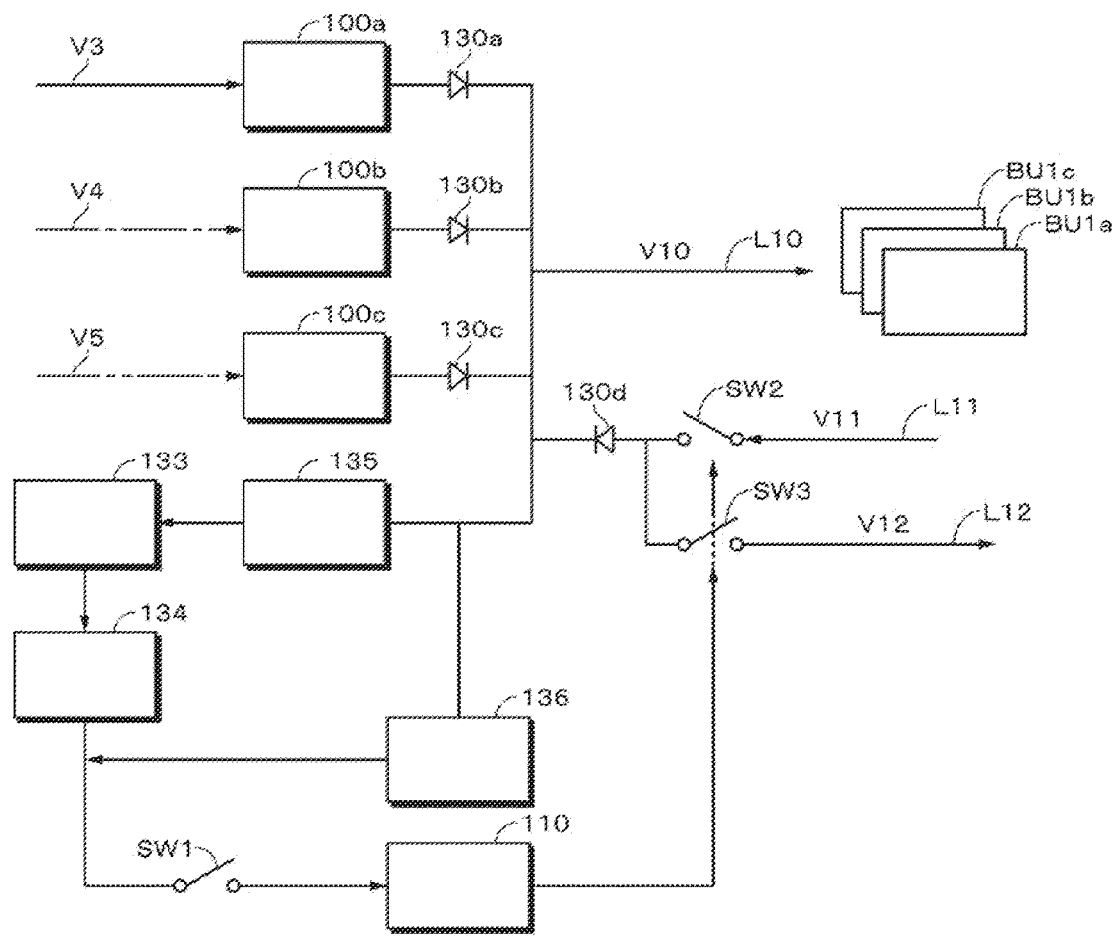
FIG. 6 is a diagram useful in explaining the configuration of a power system of a control unit.

The power supplies of the control unit CU1, the control unit CU2 and the control unit CU3 can be switched on and off independently. FIG. 6 shows an example configuration that mainly relates to a power supply system of the control unit CU1.

A diode 130a for backflow prevention is connected to an output stage of the conversion unit 100a. A diode 130b for backflow prevention is connected to an output stage of the conversion unit 100b. A diode 130c for backflow prevention is connected to an output stage of the conversion unit 100c. Using the diode 130a, the diode 130b, and the diode 130c, the conversion unit 100a, the conversion unit 100b, and the conversion unit 100c are connected in an OR configuration.

The outputs from the conversion units 100a, 100b, and 100c are combined and supplied to the battery units BU1. In reality, one output with the highest voltage out of the outputs from the conversion units 100a, 100b, and 100c is supplied to the battery units BU1. However, depending on the power consumption at the battery units BU1, a situation where outputs from a plurality of the conversion units 100 are supplied is also possible.

A main switch SW1 that is capable of being operated by the user is provided in the control unit CU1. By switching on the main switch SW1, power is supplied to the CPU 110 to activate the control unit CU1. It is also possible to use a configuration where operations of the main switch SW1, such as an on/off switching operation, can be made remotely by a remote control apparatus.

As one example, power is supplied from a battery 133 incorporated in the control unit CU1. The battery 133 is a lithium ion secondary cell, for example. The DC voltage supplied from the battery 133 is converted to a suitable voltage for the CPU 110 by a DC-DC convertor 134. The converted voltage is supplied to the CPU 110 as a power supply voltage. When the control unit CU1 is activated, the battery 133 is used. Control (for example, charging/discharging control) of the battery 133 is carried out by the CPU 110, for example.

The battery 133 can be charged based on power supplied from the battery unit BU1, for example. The battery 133 may be charged based on a voltage supplied from the conversion unit 100a and/or the conversion unit 100b.

As one example, the voltage V11 supplied from the battery unit BU1 a is supplied to a charging control unit 135. The charging control unit 135 converts the voltage V11 to an appropriate voltage and charges the battery 133 based on the converted voltage. Such charging by the charging control unit 135 is carried out according to a CVCC (Constant Voltage Constant Current) method, for example.

Note that the CPU 110 may operate based on a voltage V12 supplied from the battery unit BU1 or the voltage supplied from the conversion unit 100a and the conversion unit 100b or the like. The voltage V11 supplied from the battery unit BU1 is converted to a voltage of a predetermined level by the DC-DC converter 136. The converted voltage is supplied to the CPU 110 as a power supply voltage that enables the CPU 110 to operate.

After the control unit CU1 has been activated, the CPU 110 switches on at least one out of the conversion unit 100a, the conversion unit 100b, and the conversion unit 100c, has at least one voltage out of voltage V3, the voltage V4, and the voltage V5 input into the corresponding conversion unit(s) of the control unit CU1, and has the voltage V10 output from such conversion unit(s). The voltage V10 is supplied via the power line L10 to the battery unit BU1.

The CPU 110 carries out communication with the battery units BU1 using the signal lines SL. By carrying out such communication, the CPU 110 outputs control commands showing charging and discharging to the battery units BU1. The CPU 110 switches the switch SW2 on. The switch SW2 is constructed of a FET (Field Effect Transistor), for example. Alternatively, an IGBT (insulated Gate Bipolar Transistor) may be used. By switching on the switch SW2, the voltage V11 is supplied from a predetermined battery unit BU1 to the control unit CU1.

When the voltage V11 supplied from the battery unit BU1 is to be supplied to an external appliance, the CPU 110 switches on a switch SW3. When the switch SW3 is switched on, the voltage V12 that is based on the voltage V11 is supplied via the power line L12 to an external appliance. The voltage V12 may be the voltage V11 as it is or may be a voltage produced by subjecting the voltage V11 to a conversion process to make the voltage V11 compatible with the external appliance. Various external appliances that act as a load are connected to the power line L12. Note that power based on the voltage V12 may be supplied to a different battery unit BU1 to the battery unit BU1 being discharged and used to charge the battery unit BU1 to which such power is supplied.

A diode 130d for backflow prevention is connected to an output side (cathode side) of the switch SW2. By connecting the diode 130d, it is possible to prevent unstable power that is supplied from the solar power generating apparatus 3, the wind power generating apparatus 4, or the like from being directly supplied to an external appliance that is the load. Instead, stabilized power that is supplied from the battery unit BU1 can be supplied to such external appliance. It should be obvious that a diode may also be provided for safety purposes at the final stage of the battery unit BU1.

This completes the description of one example of the configuration of the control unit CU1 in the block BL1. Note that the configuration of the control units in the other blocks BL (for example, the control unit CU2 and the control unit CU3) may be the same as the configuration of the control unit CU1 and such control units may operate in the same way as the control unit CU1.

Note that although an example has been described where the output voltage to be prioritized is decided out of the output voltage from the conversion unit 100a, the output voltage from the conversion unit 100b, and the output voltage from the conversion unit 100c by appropriately adjusting the resistance values of the variable resistors, it is also possible to decide the output voltage to be prioritized according to another method. As one example, it is possible to decide the output voltage that is supplied with priority by adjusting the resistance values of the resistor Rc1, the resistor Rc2, and the resistor Rc3 in the respective conversion units 100.

The output voltages of the conversion units may also be changed. As one example, assumed that power supplied from the solar power generating apparatus 3 is to be used with priority. In such case, the output voltage of the conversion unit 100a changes from the range of 45V to 48V to a range of slightly higher values. As described earlier, such change is possible by appropriately setting the resistance values of the resistor Rc1, the resistor Rc2, and the resistor Rc3. By doing so, the output of the conversion unit 100a can be supplied to the battery unit BU with priority over the other conversion units (the conversion unit 100b and the conversion unit 100c).

The ranges given below are examples of the range of the output voltage.
(1) A range where both the upper limit (48V) and the lower limit (45V) are both raised (for example, a range from 45.5V to 48.5V).
(2) A range where only the lower limit is raised (for example, a range from 45.5V to 48V).
(3) A range where only the upper limit is raised (for example, a range from 45V to 48.5V).

In the example setting (1), it is possible to prioritize the output of the conversion unit 100a at all times. In the example setting (2), it is possible to prioritize the output of the conversion unit 100a when the value of the voltage V3 is low (for example, 75V to close to 80V). When the value of the voltage V3 is high, the output of the conversion unit 100a is treated in the same way as the output of the other conversion units (the conversion unit 100b and the conversion unit 100c). In the example setting (3), it is possible to prioritize the output of the conversion unit 100a when the value of the voltage V3 is high (for example, close to 100V). When the value of the voltage V3 is low (for example, 75V to close to 80V), the output of the conversion unit 100a is treated in the same way as the output of the other conversion units (the conversion unit 100b and the conversion unit 100c). As described above, the output voltage of a predetermined conversion unit can be supplied with priority to the battery units. In the same way, it is possible to supply the output of the conversion unit 100b or the conversion unit 100c with priority to the battery units BU.

1-4. Configuration of Battery Unit

A battery unit BU connected to a control unit CU is described next. In the following description, the battery unit BU1a connected to the control unit CU1 is described as one example.

FIG. 7 shows an example of the configuration of the battery unit BU1a. The battery unit BU1a includes a charging control unit 140, a discharging control unit 141, and a battery Ba. The voltage V10 is supplied from the control unit CU1 to the charging control unit 140. The voltage V11 that is the output from the battery unit BU1a is supplied via the discharging control unit 141 to the control unit CU1. The battery unit BU1a is equipped with a different power line L14 to the power lines L11. Via the power line L14, the voltage V11 is supplied directly from the discharging control unit 141 to an external appliance. The power line L14 may be omitted however.

The battery Ba that is one example of a power storage unit is a rechargeable battery such as a lithium ion secondary cell. The charging control unit 140 and the discharging control unit 141 are configured so as to be compliant with the type of battery Ba.

The charging control unit 140 includes a DC-DC converter 142a. The voltage V10 input into the charging control unit 140 is converted to a predetermined voltage by the DC-DC converter 142a. The voltage output from the DC-DC converter 142a is supplied to the battery Ba to charge the battery Ba. The value of the predetermined voltage differs according to the type and the like of the battery Ba. A voltage sensor 142b, an electronic switch 142c, and a current sensor 142d are connected to the input stage of the DC-DC converter 142a. A current sensor 142e, an electronic switch 142f, and a voltage sensor 142g are connected to the output stage of the DC-DC converter 142a.

The discharging control unit 141 is equipped with a DC-DC converter 143a. The DC-DC converter 143a generates the voltage V11 based on a. DC voltage supplied from the battery Ba to the discharging control unit 141. The voltage V11 is output from the discharging control unit 141. A voltage sensor 143b, an electronic switch 143c, and a current sensor 143d are connected to the input stage of the DC-DC converter 143a. A current sensor 143e, an electronic switch 143f, and a voltage sensor 143g are connected to the output stage of the DC-DC converter 143a.

The battery unit BU1a includes a CPU 145. The CPU 145 controls the various parts of the battery unit BU1a. As one example, the CPU 145 controls the on/off states of the electronic switches of the charging control unit 140 and the discharging control unit 141. Processing for ensuring safety, such as an overcharging prevention function and an overcurrent protection function may also be carried out by the CPU 145. The CPU 145 carries out communication with the CPU 110 of the control unit CU1 via the signal lines SL and exchanges control commands and/or data.

A memory 146, an A/D conversion unit 147, and a temperature sensor 148 are connected via a bus 149 to the CPU 145. The bus 149 includes an I2C bus, for example.

The "memory" 146 is the collective name for memories such as a ROM that stores programs to be executed by the CPU 145, a RAM used as a work memory when the CPU 145 carries out processing, and a nonvolatile memory such as an EEPROM in which various data is stored.

As one example, the A/D conversion unit 147 is supplied with sensor information in the form of analog data from the voltage sensors and/or the current sensors. The A/D conversion unit 147 converts the sensor information in the form of analog data to sensor information in the form of digital data. The sensor information in the form of digital data is supplied to the CPU 145.

The temperature sensor 148 measures the environmental temperature. As one example, the temperature sensor 148 measures the temperature inside the battery unit BU1 and/or the temperature of the periphery of the battery unit BU1. The temperature information obtained by the temperature sensor 148 is converted to digital data by the A/D conversion unit 147 and then supplied to the CPU 145.

Figure 8:
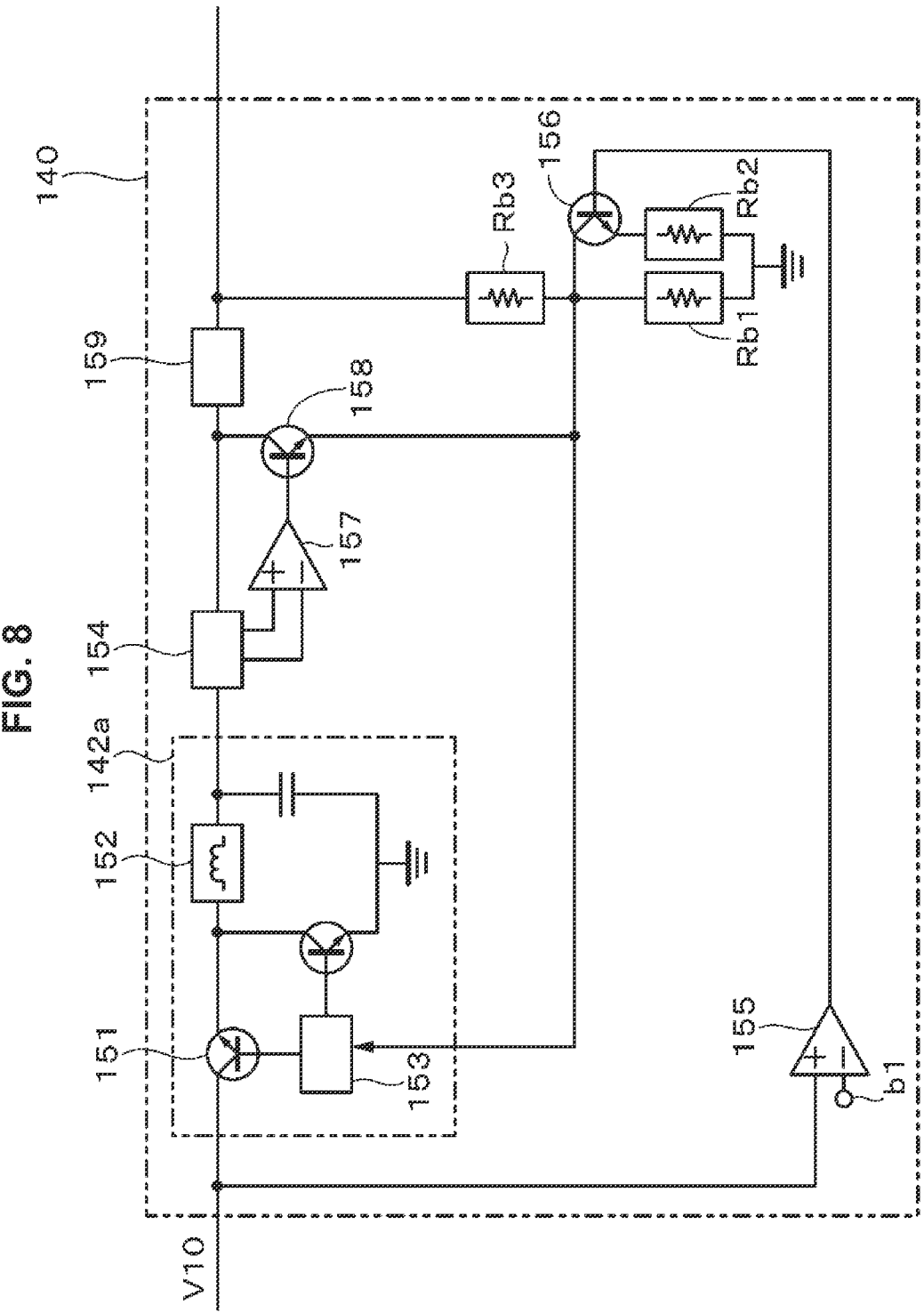
FIG. 8 is a diagram useful in explaining a specific configuration of a charging control unit.

FIG. 8 shows one example configuration of the charging control unit 140 in the battery unit BU1a. As shown in FIG. 8, the charging control unit 140 includes the DC-DC converter 142a and the feed forward control system and the feedback control system, described later. Note that in FIG. 8, the voltage sensor 142b, the electronic switch 142c, the current sensor 142d, the current sensor 142e, the electronic switch 142f, and the voltage sensor 142g are not illustrated.

As one example, the DC-DC convertor 142a includes a transistor 151, a coil 152, a control IC (Integrated Circuit) 153, and the like. The transistor 151 is controlled by the control IC 153.

The feed forward control system includes an operational amplifier 155, a transistor 156, and a resistor Rb1, a resistor Rb2, and a resistor Rb3. As one example, the output of the feed forward control system is input into a control terminal provided in the control IC 153 of the DC-DC converter 142a. The control IC 153 of the DC-DC convertor 142a adjusts the output voltage from the charging control unit 140 so that the input voltage into the control terminal is constant.

That is, the feed forward control system provided in the charging control unit 140 operates in the same way as the feed forward control system provided in the conversion unit 100a.

By equipping the charging control unit 140 with the feed forward control system, the value of the output voltage from the charging control unit 140 is adjusted to become a voltage value within a range set in advance. By adjusting the value of the output voltage from the charging control unit 140 to a voltage value within a range set in advance, the charging current for the respective batteries B electrically connected to the control unit CU1 is adjusted in accordance with changes in the input voltage (the voltage V10) from the conversion unit 100a. Accordingly, the battery unit BU1a provided in the charging control unit 140 includes a function as a charging apparatus that changes the charging rate for the battery Ba.

By changing the charging rates for the respective batteries B electrically connected to the control unit CU1, the values of the input voltages for the charging control units 140 of the respective battery units BU1 (which may be the value of the output voltage from at least one of the conversion unit 100a, the conversion unit 100b, and the conversion unit 100c) are adjusted so as to become voltage values within a range set in advance.

As shown in FIG. 8, an output voltage is taken from the charging control unit 140 via the DC-DC converter 142a, a current sensor 154, and a filter 159. Such output voltage is supplied to the battery Ba.

As described later, the value of the output voltage from the charging control unit 140 is adjusted so as to become a voltage value within a range set in advance in keeping with the type of battery connected to the charging control unit 140. The range of the output voltage from the charging control unit 140 is adjusted by appropriately selecting the resistance values of the resistor Rb1, the resistor Rb2, and the resistor Rb3.

In this way, since the range of the output voltage from the charging control unit 140 is decided separately in accordance with the type of battery B connected to the charging control unit 140, there are no particular limitations on the type of battery B provided in a battery unit BU1. This is because the resistance values of the resistor Rb1, the resistor Rb2, and the resistor Rb3 inside the charging control unit 140 may be appropriately selected in accordance with the type of battery B that is connected.

Note that although a configuration where the output of the feed forward control system is input into the control terminal of the control IC 153 is illustrated in FIG. 8, the CPU 145 of the battery unit BU 1 may provide an input to the control terminal of the control IC 153. As one example, the CPU 145 of the battery unit BU1 may acquire information relating to the input voltage for the battery unit BU1 via the signal lines SL from the CPU 110 of the control unit CU1. The CPU 110 of the control unit CU1 enables information relating to the input voltage for the battery unit BU1 to be acquired from the measurement results of the voltage sensor 101g, the voltage sensor 102g, the voltage sensor 103g, or the like.

The feed forward control system provided in the charging control unit 140 will now be described.

A voltage that is kb times (where kb is several tens to one hundred or so) the input voltage (the voltage V10) into the charging control unit 140 is input into the non-inverting input terminal of the operational amplifier 155. Meanwhile, the input into the inverting input terminal hi of the operational amplifier 155 is voltage that is kb times a voltage Vb to be set as a lower limit of the output voltage of the conversion unit 100a, the conversion unit 100b, and the conversion unit 100c. The input voltage (kb×Vb) into the inverting input terminal b1 of the operational amplifier 155 is applied from the CPU 145, for example.

Accordingly, if the input voltage into the charging control unit 140 is a voltage that is sufficiently higher than the constant voltage Vb set in advance, the feed forward control system provided in the charging control unit 140 pulls up the output voltage from the charging control unit 140. Also, if the input voltage for the charging control unit 140 approaches the constant voltage lib that is set in advance, the feed forward control system pulls down the output voltage from the charging control unit 140.

In the same way as the transistor 125 shown in FIG. 5, the transistor 156 is disposed so that when the input voltage into the charging control unit 140 exceeds a predetermined voltage, the value of the output voltage from the charging control unit 140 does not exceed an upper limit set in advance. Note that the range of the values of the output voltage from the charging control unit 140 is decided by the combination of the resistance values of the resistor Rb1, the resistor Rb2, and the resistor Rb3. For this reason, the resistance values of the resistor Rb1, the resistor Rb2, and the resistor Rb3 are adjusted in accordance with the type of battery B connected to the charging control unit 140.

As described earlier, the charging control unit 140 is further equipped with the feedback control system. As one example, the feedback control system includes a current sensor 154, an operational amplifier 157, a transistor 158, and the like.

If the current supplied to the battery Ba exceeds a predetermined value set in advance, the feedback control system pulls down the output voltage from the charging control unit 140 to limit the current supplied to the battery Ba. The extent to which the current supplied to the battery Ba is limited by the feedback control system is decided in accordance with the rating of the battery Ba connected to the charging control unit 140.

By pulling down the output voltage from the charging control unit 140 using either the feed forward control system or the feedback control system, the current supplied to the battery Ba is limited. As a result of the current supplied to the battery Ba being limited, the battery Ba connected to the charging control unit 140 is charged at a slower rate.

Figure 9:
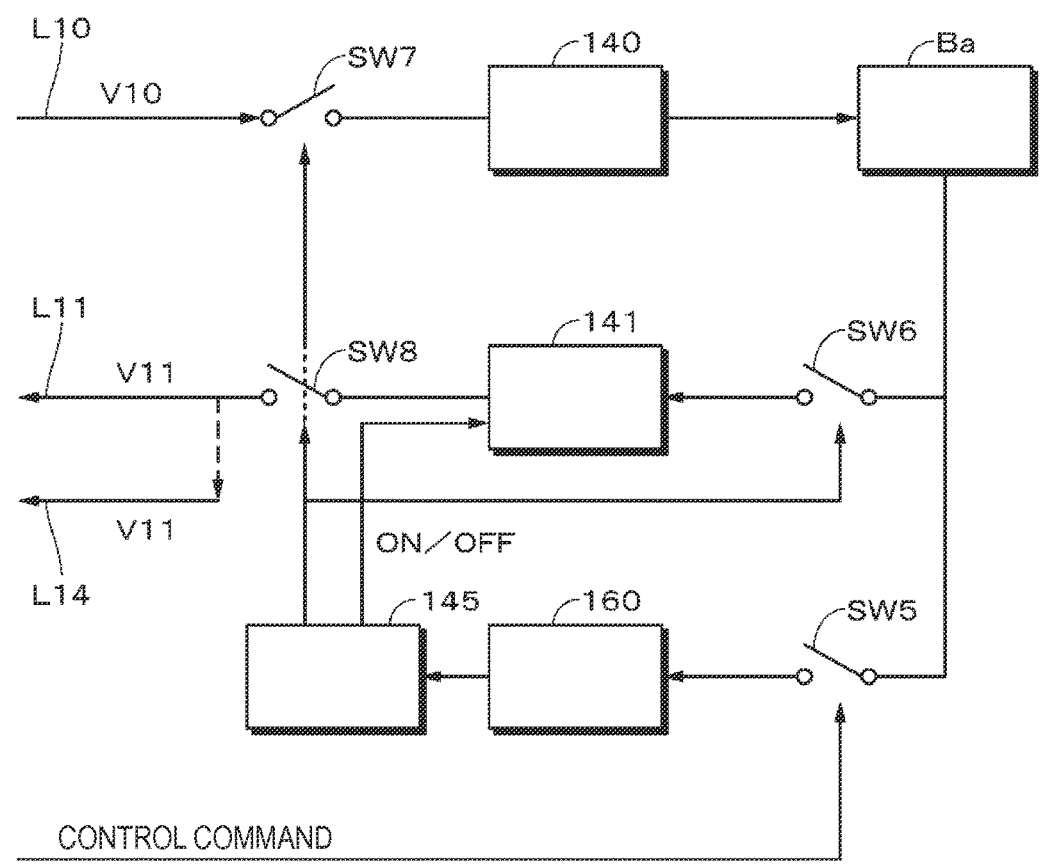
FIG. 9 is a diagram useful in explaining the configuration of a power system of a battery unit.

FIG. 9 shows an example configuration of the battery unit BU1$a$ that mainly relates to a power supply system. The battery unit BU1$a$ is not equipped with a main switch. A switch SW5 and a DC-DC converter 160 are connected between the battery Ba and the CPU 145. A switch SW6 is connected between the battery Ba and the discharging control unit 141. A switch SW7 is connected to the input stage of the charging control unit 140. A switch SW8 is connected to the output stage of the discharging control unit 141. The respective switches SW include FETs, for example.

The battery unit BU1$a$ is activated by a control command from the control unit CU1, for example. As one example, a high level signal is constantly supplied from the control unit CU1 via a predetermined signal line. This means that by merely connecting the port of the battery unit BU1$a$ to the predetermined signal line, a high level signal is supplied to the switch SW5 to switch on the switch SW5. By switching on the switch SW5, the battery unit BU1$a$. is activated. By switching on the switch SW5, the voltage from the battery Ba is supplied to the DC-DC converter 160. A power supply voltage based on the voltage from the battery Ba is generated by the DC-DC converter 160. The power supply voltage is supplied to the CPU 145 so that the CPU 145 operates.

The CPU 145 carries out processing according to a control command from the control unit CU1. As one example, a control command indicating charging is supplied from the control unit CU1 to the CPU 145. In accordance with the command indicating charging, the CPU 145 switches off the switches SW6 and SW8 and then switches on the switch SW7. Due to the switch SW7 being switched on, the voltage V10 supplied from the control unit CU1 is supplied to the charging control unit 140. The voltage V10 is converted to a voltage of a predetermined value by the charging control unit 140 and the battery Ba is charged by the converted voltage. Note that the method of charging the battery Ba can be changed as appropriate according to the type of the battery Ba.

A control command that issues an instruction for discharging for example is supplied from the control unit CU1 to the CPU 145. In accordance with the control command that issues an instruction for discharging, the CPU 145 switches off the switch SW7 and switches on the switch SW6 and the switch SW8. As one example, the switch SW8 is switched on a certain time after the switch SW6 has been switched on. By switching on the switch SW6, a voltage is supplied from the battery Ba to the discharging control unit 141. The voltage supplied from the battery Ba is converted to the voltage V11 by the discharging control unit 141. The converted voltage V11 is supplied via the switch SW8 to the control unit CU1. Note that to prevent a collision with the output from another battery unit BU1, a diode is added to a final stage of the switch SW8.

Note that it is possible to switch the discharging control unit 141 on and off according to control by the CPU 145. A control command for switching on and off is supplied to the discharging control unit 141 via an on/off signal line from the CPU 145 to the discharging control unit 141. In keeping with the control command, at least one of the electronic switch 143$c$ and the electronic switch 143$f$ of the discharging control unit 141 is switched on and off.

This completes the description of the battery unit BU1$a$ as one example of the configuration of the battery unit BU. Note that as one example, the battery unit BU1$b$ and the battery unit BU1$c$ have the same configuration as the battery unit BU1$a$ and operate in the same way. There may also be differences in configuration between the respective battery units BU. For example, the battery B included in the battery unit BU1$b$ may be a secondary cell aside from a lithium ion cell.

As one example, the battery units of the other blocks (for example, the battery unit BU2$a$ and the battery unit BU3$a$) have the same configuration as the battery unit BU1$a$ and operate in the same way.

1-5. Overall Operation

Next, one example of the operation of the block BL1 will be described. As one example, the block BL2 and the block BL3 operate in the same way as the block BL1. Description relating to the operation of the block BL2 and the block BL3 is omitted as appropriate.

The voltage V3, the voltage V4, and the voltage V5 are supplied to the control unit CU1 in the block BL1. The voltage V3 is received by the conversion unit 100$a$, the voltage V4 is received by the conversion unit 100$b$, and the voltage V5 is received by the conversion unit 100$c$. The voltage V10 that varies in a range of 45 to 48V, for example, is generated by the respective conversion units 100.

Here, the outputs of the solar power generating apparatus 3 and the wind power generating apparatus 4 in particular vary according to the weather. As one example, it is effective to use the output of the solar power generating apparatus 3 during daytime when the weather is fine and to use the output of the wind power generating apparatus 4 during nighttime, when a typhoon is approaching, and the like. That is, although the voltage V10 is generated by three conversion units 100 (the conversion unit 100$a$, the conversion unit 100$b$, and the conversion unit 100$c$), it is preferable to select a predetermined voltage V10 out of such voltages V10 in keeping with the weather or the like and to supply such voltage V10 to the battery units BU1. Alternatively, it is preferable to switch on only a conversion unit whose output is to be used.

As described earlier, as one example, by appropriately adjusting the resistance values of the variable resistors (the variable resistor 101$h$, the variable resistor 102$h$, and the variable resistor 103$h$), it is possible to select one voltage V10 out of the voltages V10 generated by the three conversion units 100. In the following description, a situation where the voltage V10 generated by the conversion unit 100$a$ is selected and the voltage V10 generated by the conversion unit 100$a$ is supplied to the battery unit BU1 is described.

If the voltage V3 supplied from the solar power generating apparatus 3 is sufficiently high (for example, close to 100V), the voltage V10 generated by the conversion unit 100$a$ becomes approximately 48V. Here, if insolation of the solar cells of the solar power generating apparatus 3 decreases and the voltage V3 falls, the voltage V10 will also fall. In keeping with the fall in the voltage V10, control that limits charging is carried out by the charging control unit 140 of the battery unit BU1 (which may be any of the battery unit BU1a, the battery unit BU1b, and the battery unit BU1c) presently being charged. That is, the load from the viewpoint of the solar cells of the solar power generating apparatus 3 is reduced.

In keeping with the reduction in the load from, the viewpoint of the solar cells of the solar power generating apparatus 3, the voltage V3 that is the terminal voltage of the solar cells increases (i.e., recovers). In keeping with the increase in the voltage V3, the voltage V10 also increases. The charging control unit 140 of the battery unit BU1 that is presently being charged pulls up the output voltage to raise the charging rate. After this, control is repeatedly carried out in a cooperative manner by the conversion unit 100a of the control unit CU1 and the battery unit BU1 until the voltage V10 converges on a certain value and a balance is achieved between the demanded and supplied amounts of power. In the following description, control carried out in a cooperative manner by a conversion unit of a control unit CU and a battery unit BU connected to such control unit CU is sometimes referred to as "cooperative control".

Note that a fall in the terminal voltage of the solar cells is not limited to a fall in the insolation of the solar cells. As one example, when there is an increase in the battery units BU1 being charged, the load from the viewpoint of the solar cells of the solar power generating apparatus 3 increases and the voltage V10 falls. In such case also, control that limits the charging is carried out in the battery unit BU1 and cooperative control by the conversion unit 100a of the control unit CU1 and the battery unit BU1 is repeated. In this way, oven if the supplied power varies, it is possible for the battery unit to autonomously control the charging in keeping with such variations.

Control is also carried out in the same way when power supplied from the wind power generating apparatus 4 is used. That is, when the voltage V10 output from the conversion unit 100b is supplied to the battery unit BU1, cooperative control is carried out in the same way by the conversion unit 100b of the control unit CU1 and the battery unit BU1.

Control is also carried out in the same way when power supplied from the biomass power generating apparatus 5 is used. That is, when the voltage V10 output from the conversion unit 100c is supplied to the battery unit BU1, cooperative control is carried out in the same way by the conversion unit 100c of the control unit CU1 and the battery unit BU1. The output from the biomass power generating apparatus 5 has comparatively little variation compared to the outputs of the solar power generating apparatus 3 and the wind power generating apparatus 4. However, when the output of the biomass power generating apparatus 5 is used, if the number of battery units BU1 to be charged increases, the voltage V10 output from the conversion unit 100c will fall in such case also, the battery unit BU1 controls charging in accordance with the output of the biomass power generating apparatus 5 to maintain a balance between the demanded and supplied amounts of power.

Cooperative control is also carried out in the same way by the control unit CU and the battery units BU in the other blocks (that is, the block BL1 and block BL2). By carrying out cooperative control in each block BL, a balance between the demanded and supplied amounts of power is maintained across the entire system 1.

Note that one characteristic of the wind power generating apparatus 4 is that the generator unit has a large L (reactance) component, so that a constant discharge is achieved even if the load is large and the rotational speed of the generator unit falls. However, if the large load continues to be applied, there are cases where the rotor of the wind power generating apparatus 4 will eventually stop, thereby stopping the output of the wind power generating apparatus 4. For this reason, it is desirable to maintain a state where the generator unit rotates at a predetermined speed or higher regardless of variations in the load.

Although in the example described earlier, the conversion unit 100b adjusts the voltage value of the voltage V10 that is the output voltage within a range of 45V to 48V in accordance with the magnitude of the voltage V4 that is the input voltage, as an alternative example it is also possible to adjust the voltage value of the voltage V10 in accordance with a voltage (referred to here out of convenience as the "voltage V50") corresponding to a predetermined rotational speed of the generator unit. Since the amount of power generated by a wind power generating apparatus is generally believed to be proportional to the rotational speed of the generator unit, it is possible to set the voltage V50 corresponding to the predetermined rotational speed. The voltage V50 may be input into the inverting input terminal c1 of the operational amplifier 124 in place of the standard voltage (75V) described earlier.

By doing so, if the voltage V4 approaches the voltage V50, the cooperative control described earlier is carded out so that the charging rate of the battery units BU is reduced, for example. It is possible to reduce the load and prevent the voltage V4 from falling below the voltage V50. In other words, it is possible to prevent the rotational speed of the generator unit of the wind power generating apparatus 4 from falling below a predetermined rotational speed.

1-6. Detailed Operation

The cooperative control carried out when the output of the solar power generating apparatus 3 is used will now be described in detail.

1-6-1. MPPT Control

First, an overview of MPPT (Maximum Power Point Tracking) control is given below.

FIG. 10A is a graph showing the voltage-current characteristics of a solar cell. In FIG. 10A, the vertical axis represents the terminal current of the solar cell and the horizontal axis represents the terminal voltage of the solar cell. In FIG. 10A, "Isc" represents the output current when the terminals of the solar cell are shorted during insolation and "Voc" represents the output voltage when the terminals of the solar cell are opened during insolation. Isc and Voc are therefore respectively referred to as the "short-circuit current" and the "open-circuit voltage".

As shown in FIG. 10A, during insolation, the terminal current of the solar cell has a maximum value when the terminals of the solar cell are shorted and the terminal voltage of the solar cell at such time is substantially 0V. Meanwhile, during insolation, the terminal voltage of the solar cell has a maximum value when the terminals of the solar cell are opened and the terminal current of the solar cell at such time is substantially 0 A.

It is assumed here that a graph showing the voltage-current characteristics of the solar cell is expressed by the curve C1 shown in FIG. 10A. Here, if the solar cell is connected to a load, the voltage and current taken from the solar cell are decided by the power consumption that is necessary for the connected load. Points on the curve C1 expressed by pairs of a terminal voltage and a terminal current at such time are referred to as "operating points" of the solar cell. Note that FIG. 10A schematically shows the positions of the operating points and does not show the actual positions of the operating points. This also applies to the operating points given in the other drawings that accompany the present disclosure.

By changing between operating points on the curve, expressing the voltage-current characteristics of a solar cell, it is possible to find a pair of a terminal voltage Va and a terminal current Ia where the product of the terminal voltage and the terminal current, that is, the generated power, reaches a maximum. The point expressed by the pair of the terminal voltage Va and the terminal current Ia where the power obtained by the solar cell reaches a maximum is referred to as the "optimal operating point" of the solar cell.

When a graph showing the voltage-current characteristics of the solar is expressed by the curve C1 shown in FIG. 10A, the maximum power obtained from the solar cell is found as the product of the Va and Ia at the optimal operating point. That is, when a graph showing the voltage-current characteristics of the solar cell is expressed by the curve C1 shown in FIG. 10A, the maximum power obtained from the solar cell is expressed as the area (Va×Ia) of the region shown by the shading in FIG. 10A. Note that the value given by dividing (Va×Ia) by (Voc×Isc) is the fill factor.

The optimal operating point changes according to the necessary amount of power for the load connected to the solar cell and a point PA showing the optimal operating point moves on the curve V1 in accordance with changes in the necessary amount of power for the load connected to the solar cell. If the necessary amount of power for the load connected to the solar cell is low, a smaller current than the terminal current at the optimal operating point will suffice for supplying a current to the load. For this reason, the value of the terminal voltage of the solar cell at this time is higher than the voltage value at the optimal operating point. Meanwhile, if the necessary amount of power for the load is larger than the amount of power that can be supplied at the optimal operating point, since the amount of power that can be provided by the present level of insolation is exceeded, it is believed that the terminal voltage of the solar cell will fall to zero.

The curves C2 and C3 shown in FIG. 10A show the voltage-current characteristics of solar cells in a case where insolation of the solar cell has changed, for example. In this example, the curve C2 shown in FIG. 10A corresponds to the voltage-current characteristics for a case where the insolation of the solar cell has increased and the curve C3 shown in FIG. 10A corresponds to the voltage-current characteristics for a case where the insolation of the solar cell has decreased As one example, if the insolation of the solar cell increases and the curve showing the voltage-current characteristics of the solar cell changes from the curve C1 to the curve C2, the optimal operating point also changes in keeping with the increase in insolation of the solar cell. Note that at this time, the optimal operating point changes from a point on the curve C1 to a point on the curve C2.

MPPT control simply refers to finding the optimal operating point in response to a change in the curve expressing the voltage-current characteristics of the solar cell and controls the terminal voltage (or the terminal current) so as to maximize the power obtained from a solar cell.

FIG. 10B is a graph (P-V curve) expressing the relationship between the terminal voltage of a solar cell and the power generated by the solar cell for a case where the voltage-current characteristics of the solar cell are expressed by a given curve.

As shown in FIG. 10B, if the power generated by the solar cell is assumed to reach a maximum value Pmax at a terminal voltage that gives the optimal operating point, the terminal voltage that gives the optimal operating point can be found by the so-called "hill climbing method". The series of processes described below are normally carried out by a CPU or the like of a power conditioner connected between the solar cell and the power system.

As one example, an initial value of the voltage input from the solar cell is set as V0 and the generated power P0 at such time is calculated. Next, the voltage input from the solar cell is increased by $\epsilon$ so that V1=V0+$\epsilon$, (where $\epsilon$>0). Next, the generated power P1 at such time is calculated with the voltage input from the solar cell as V1. After this, the obtained P0 and P1 are compared and if P1>P0, the voltage input from the solar cell is increased by $\epsilon$ so that V2=V1+$\epsilon$. Next, the generated power P2 at such time is calculated with the voltage input from the solar cell as V2. After this, the obtained P1 and P2 are compared and if P2>P1 the voltage input from the solar cell is increased by $\epsilon$ so that V3=V2+$\epsilon$. Next, the generated power P3 at such time is calculated with the voltage input from the solar cell as V3.

If it is assumed here that P3<P2, the terminal voltage that gives the optimal operating point will be between V2 and V3. In this way, by adjusting the size of $\epsilon$, it is possible to find a terminal voltage that gives the optimal operating point with an arbitrary precision. A bisection method algorithm can be used as the procedure described above. Note that since it is not possible to use a simple hill climbing method when there are two or more peaks in the P-V curve, such as in cases where a shadow is cast on part of the insolation surface of the solar cell, it is necessary to appropriately configure the control program.

According to MPPT control, since the terminal voltage is adjusted to ensure that the load from the viewpoint of the solar cell is optimal at all times, it is possible to extract the maximum power from the solar cell in various weather conditions. On the other hand, since analog/digital conversion (A/D conversion) is necessary to calculate the terminal voltage that gives the optimal operating point and the calculation also includes multiplication, such control is time consuming. For this reason, there are cases where MPPT control is not capable of coping with sudden changes in insolation of a solar cell, such as when the insolation of the solar cell suddenly changes due to the sky suddenly clouding over.

1-6-2. Control According to Voltage Following

Here, when comparing the curves C1 to C3 shown in FIG. 10A, the changes in the open-circuit voltage Voc in response to changes in insolation of the solar cell (which may be changes in the curve showing the current-voltage characteristics) are small compared to the changes in the short-circuit current Isc. It is also known that solar cells have very similar voltage-current characteristics and that for a crystalline silicon solar cell, the terminal voltage that gives the optimal operating point is in the region of around 70% to 80% of the open-circuit voltage. Accordingly, it is expected that if an appropriate voltage value is set as the terminal voltage of the solar cell and the output current of a converter is adjusted so that the terminal voltage of the solar cell becomes such set voltage value, it will be possible to efficiently extract power from the solar cell. Such control that limits current is referred to as "voltage following".

An overview of control according to voltage following is given below. As a premise, it is assumed that a switching element is disposed between the solar cell and the power conditioner and that a voltage measuring device is disposed between the solar cell and the switching element. It is also assumed that sunlight is incident on the solar cell.

First, the switching element is switched off and after a predetermined period has passed following the switching off of the switching element, the voltage measuring device measures the terminal voltage of the solar cell. Here, a predetermined period is allowed to pass from the switching-off of the switching element to the measurement of the terminal voltage of the solar cell to allow the terminal voltage of the solar cell to stabilize. The terminal voltage at this time is the open-circuit voltage Voc.

Next, a voltage value that is for example 80% of the open-circuit voltage Voc obtained by measurement is calculated as a target voltage value and such target voltage value is temporarily stored in a memory or the like. Next, the switching element is switched on and the supplying of power to a converter inside the power conditioner commences. At this time, the output current of the converter is adjusted so that the terminal voltage of the solar cell becomes the target voltage value. The series of processes described above is carried out at intervals of an arbitrary period.

Compared to MPPT control, control according to voltage following has a large loss in the power obtained from the solar cell, but can be realized by a simple circuit configuration and is low cost, which makes it possible to lower the cost of a power conditioner equipped with a converter.

Figure 11:
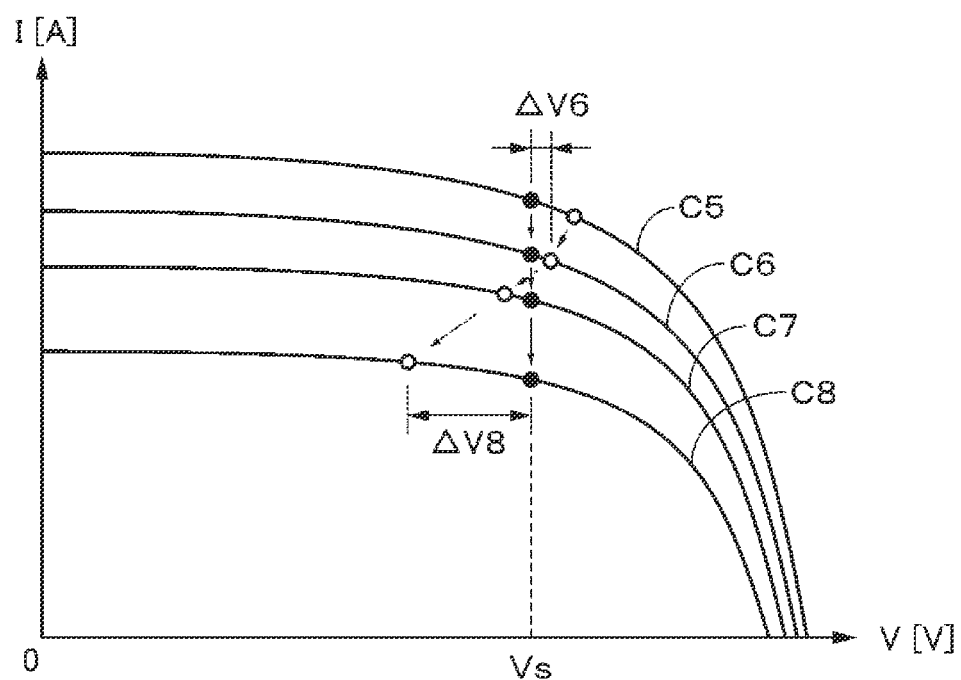
FIG. 11 is a graph useful in explaining changes in operating points in response to a change in the curve expressing the voltage-current characteristics of a solar cell.

FIG. 11 is a diagram useful in explaining changes in the operating points in response to changes in a curve expressing the voltage-current characteristics of a solar cell. In FIG. 11, the vertical axis represents the terminal current of the solar cell and the horizontal axis represents the terminal voltage of the solar cell. The white circles in FIG. 11 represent the operating points when MPPT control is carried out and the black circles represent the operating points when control according to voltage following is carried out It is assumed here that the curve expressing the voltage-current characteristics of the solar cell is the curve C5. Next, if the curve expressing the voltage-current characteristics of the solar cell changes in order from the curve C5 to the curve C8 in keeping with changes in insolation of the solar cell, the operating points according to the respective control methods will also change in keeping with the changes in the curve expressing the voltage-current characteristics of the solar cell. Note that since the open-circuit voltage Voc changes little with respect to changes in insolation of the solar cell, in FIG. 11, the target voltage value for when control is carried out according to voltage following is regarded as a substantially constant value Vs.

As can be understood from FIG. 11, if the curve expressing the voltage-current characteristics of the solar cell is the curve C6, there is a low degree of separation between the operating point for MPPT control and the operating point for control according to voltage following. This means that if the curve expressing the voltage-current characteristics of the solar cell is the curve C6, it is believed that there will not be a large difference in the generated power obtained from the solar cell when either control method is used.

Meanwhile, if the curve expressing the voltage-current characteristics of the solar cell is the curve C8, there is a high degree of separation between the operating point for MPPT control and the operating point for control according to voltage following. As one example, as shown in FIG. 11, when the differences $\Delta V6$ and $\Delta V8$ between the terminal voltage when MPPT control is used and the terminal voltage when control according to voltage following is used are compared, $\Delta V6<\Delta V8$. For this reason, if the curve expressing the voltage-current characteristics of the solar cell is the curve C8, there will be a large difference between the generated power obtained from the solar cell when MPPT control is used and the generated power obtained from the solar cell when control according to voltage following is used.

1-6-3. Cooperative Control by Control Unit and Battery Unit

Next, cooperative control by a control unit and a battery unit will be described.

Normally, when attempting to charge a battery using power obtained from a solar cell, MPPT control or control according to voltage following described above is carried out by a power conditioner disposed between the solar cell and the battery. Here, the expression "a battery" includes a configuration where a plurality of batteries (or "cells") are incorporated and operate as a single unit, and although such battery will include a plurality of cells, such cells are normally of the same type. In other words, it is expected that the MPPT control or control according to voltage following described above will be carried out entirely by the power conditioner connected between the solar cell and the batter. It is also normal during charging for the number and configuration (such as parallel or series connections) of the batteries subject to charging to not change and for the number and configuration of batteries subject to charging to be fixed during charging.

Meanwhile, with cooperative control, the control unit CU1 and the plurality of battery units BU1a, BU1b, BU1c, . . . to carry out autonomous control so as to achieve a balance between the output voltage of the control unit CU1 and the voltages necessary for the plurality of battery units BU1. As described earlier, the batteries B contained in the battery unit BU1a, the battery unit BU1b, the battery unit BU1c, . . . may be any type. That is, the control unit CU according to the present embodiment of the disclosure is capable of cooperative control for a plurality of types of battery B.

In addition, in the system 1, the respective battery units BU1 are detachably attached to the control unit CU1. That is, during the generation of power by the solar cell of the solar power generating apparatus 3, the number of battery units BU1 connected to the control unit CU1 may change and the number of battery units BU1 to be charged may change.

Although the load from the viewpoint of the solar cell may change during the generation of power by the solar cell, by carrying out cooperative control, it is possible to cope not only with changes in insolation of the solar cell but also with changes in the load from the viewpoint of the solar cell during the generation of power by the solar cell. In addition, cooperative control is carried out for each block out of the plurality of blocks BL, which makes it possible to achieve a balance between the supplying of power and the consumption of power across the entire system 1.

By connecting the control unit CU1 and the battery units BU1 described earlier, it is possible to construct a control system that dynamically changes the charging rate according to the ability of the control unit CU1 to supply power. An example of such cooperative control will now be described. Note that although a situation where one battery unit BU1a is connected to the control unit all in an initial state is described here, the same applies when a plurality of battery units BU1 are connected to the control unit CU1.

As one example, it is assumed that an input side of the control unit all is connected to a solar cell and that an output side is connected to the battery unit BU1a. It is also assumed for example that the upper limit of the output voltage of the solar cell is 100V and that it is desirable to suppress the lower limit of the output voltage of the solar cell to 75V That is, it is assumed that Vt0 is set equal to 75V and the input voltage into the inverting input terminal of the operational amplifier 124 is ((kc×75)V.

It is also assumed that the upper limit and the lower limit of the output voltage (voltage V10) from the control unit CU1 are respectively set at 48V and 45V, for example. That is, Vb is set at 45V and the input voltage for the inverting input terminal of the operational amplifier 155 is set at (kb×45)V. Note that the value 48V that is the upper limit on the output voltage from the control unit CU1 is adjusted by appropriately selecting the resistor Rc1 and the resistor Rc2 inside the conversion unit 100a. In other words, it is assumed that the target voltage value of the output from the control unit CU1 is set at 48V.

In addition, it is assumed that the upper limit and the lower limit of the output voltage from the charging control unit 140 of the battery unit BU1a are respectively set at 42V and 28V, for example. Accordingly, the resistor Rb1, the resistor Rb2, and the resistor Rb3 inside the charging control unit 140 are selected so that the upper limit and the lower limit of the output voltage from the charging control unit 140 become 42V and 28V, respectively.

Note that the voltage V10 that is the input voltage into the charging control unit 110 being at the upper limit corresponds to a state where the charging rate for the battery Ba is 100% and the voltage V10 being at the lower limit corresponds to a state where the charging rate for the battery Ba is 0%. That is, when the voltage V10 into the charging control unit 140 is 48V, this corresponds to a state where the charging rate for the battery Ba is 100% and when the voltage V10 into the charging control unit 140 is 45V, this corresponds to a state where the charging rate for the battery Ba is 0%. In keeping with the voltage V10 fluctuating in the range of 15V to 48V, the charging rate is set in a range of 0 to 100%.

Note that it is also possible to carry out charging rate control of a battery separately to the cooperative control. That is, to carry out constant current charging at the start of charging, the output from the charging control unit 140 is fed back and adjusted to adjust the charging voltage so as to keep the charging current at a certain level or below and at the final stage, the charging voltage is kept at a certain level or below. Here, the charging voltage to be adjusted is set no greater than the voltage adjusted by the cooperative control described above. By doing so, the power supplied from the control unit CU1 will be sufficient for the charging process.

First, changes in the operating points when cooperative control is carried out will be described for a case where the insolation of the solar cell has changed.

FIG. 12A is a diagram useful in explaining changes in the operating points when cooperative control is carried out for a ease where the insolation of the solar cell has decreased. In FIG. 12A, the vertical axis represents the terminal current of the solar cell and the horizontal axis represents the terminal voltage of the solar cell. The white circles in FIG. 12A represent operating points for when MPPT control is carried out and the shaded circles in FIG. 12A represent operating points when cooperative control is carried out. The curves C5 to C8 shown in FIG. 12A show voltage-current characteristics of a solar cell for cases where insolation of the solar cell changes.

At this time, it is assumed that the necessary power for the battery Ba is 100 W (watts) and that the voltage-current characteristics of the solar cell are expressed by the curve C5 (i.e., the sunniest state). It is assumed here that the operating point of the solar cell at such time is indicated by the point a on the curve C5 for example and that the power (supplied amount) supplied to the battery Ba from the solar cell via the conversion unit 100a and the charging control unit 140 exceeds the power (demanded amount) necessary for the battery Ba.

If the power supplied from the solar cell to the battery Ba exceeds the power necessary for the battery Ba, the voltage V10 that is the output voltage from the control unit CU1 to the battery unit BU1a is the upper limit of 48V. That is, since the voltage V10 that is the input voltage into the battery unit BU1a is the upper limit of 48V, the output voltage from the charging control unit 140 of the battery unit BU1a is set at the upper limit of 42V and the charging of the battery Ba is carried out at a charging rate of 100%. Note that although charging is described as being carried out at 100%, the charging of the battery is not limited to 100% and it is possible to appropriately adjust the charging rate in accordance with the characteristics of the battery.

If the sky becomes cloudy, the curve expressing the voltage-input characteristics of the solar cell changes from the curve C5 to the curve C6. Due to the sky becoming cloudy, the terminal voltage of the solar cell gradually falls and the output voltage from the control unit CU1 to the battery unit BU1a gradually falls. Accordingly, in keeping with the curve expressing the voltage-current characteristics of the solar cell changing from the curve C5 to the curve C6, the operating point of the solar cell moves to the point b on the curve C6, for example.

If the sky becomes cloudier from this state, as the curve expressing the voltage-input characteristics of the solar cell changes from the curve C6 to the curve C7 and the terminal voltage of the solar cell gradually falls, the voltage V10 that is the output voltage from the control unit CU1 to the battery unit BU1a falls. If the voltage V10 falls by a certain amount, it becomes no longer possible to supply 100% power to the battery Ba.

Here, if the terminal voltage of the solar cell approaches Vt0=75V that is the lower limit, the conversion unit 100a of the control unit CU1 starts to pull down the voltage V10 for the battery unit BU1a from 48V to Vb=45V.

If the voltage V10 is pulled down, since the input voltage into the battery unit BU1a falls, the charging control unit 140 of the battery unit BU1a starts to pull down the output voltage to the battery Ba. If the voltage V10 is pulled down, the charging current supplied to the battery Ba is reduced and the rate of the charging of the battery Ba connected to the charging control unit 140 is reduced. That is, the charging rate of the battery Ba is pulled down.

If the charging rate of the battery Ba is pulled down, the power consumption will also fall, which means that the load viewed from the solar cell will also decrease. When this happens, the terminal voltage of the solar cell increases (recovers) by an amount corresponding to the reduction in the load from the viewpoint of the solar cell.

Once the terminal voltage of the solar cell has risen, the extent of the pulling down of the voltage V10 by the control unit CU1 is reduced and the input voltage into the battery unit BU1a. increases. Due to the rise the input voltage into the battery unit BU1a, the charging control unit 140 of the battery unit BU1a pulls up the output voltage from the charging control unit 140 to increase the charging rate of the battery Ba.

Once the charging rate of the battery Ba is pulled up, the load from the viewpoint of the solar cell is increased and the terminal voltage of the solar cell decreases by an amount corresponding to the increase in the load from the viewpoint of the solar cell. Once the terminal voltage of the solar cell falls, the conversion unit 100a of the control unit CU1 pulls down the output voltage of the battery unit BU1a.

After this, adjustment of the charging rate described earlier is automatically repeated until the output voltage from the control unit CU1 to the battery unit BU1a converges on a certain value and a balance is achieved between the demanded amount and the supplied amount of power.

Unlike MPPT control, cooperative control is not control performed by software. For this reason, cooperative control does not have to calculate of the terminal voltage that produces the optimal operating point. Adjustment of the charging rate according to cooperative control also does not have to involve computation by a CPU. This means that cooperative control has lower power consumption than MPPT control and that adjustment of the charging rate described earlier is carried out in a short time of around several nanoseconds to several hundred nanoseconds.

Since the conversion unit 100a and the charging control unit 140 merely detect the magnitudes of their respective input voltages and adjust their output voltages, analog/digital conversion is unnecessary and communication between the control unit CU1 and the battery unit BU1a is also unnecessary. Accordingly, a complex circuit is not necessary for cooperative control and the circuit for realizing cooperative control is small.

Here, it is supposed that the control unit CU1 was capable of supplying 100W of power at the point a on the curve C5 and assumed that the output voltage from the control unit CU1 to the battery unit BU1a has converged on a given value That is, it is assumed that the operating point of the solar cell has moved to the point c on the curve C7, for example. At this time, although the power supplied to the battery Ba falls below 100 W, as shown in FIG. 12A, depending on how the value of the voltage Vt0 is selected, it is possible to supply the battery Ba with power that is in no way inferior to the case where MPPT control was carried out.

If the sky becomes even cloudier, the curve expressing the voltage-input characteristics of the solar cell changes from the curve C7 to the curve C8 and the operating point of the solar cell moves to the point d on the curve C8, for example.

As shown in FIG. 12A, since the balance between the demanded amount and the supplied amount of power are adjusted based on cooperative control, the terminal voltage of the solar cell will not fall below the voltage Vt0. That is, even when there has been an extreme fall in insolation of the solar cell, due to the cooperative control, the terminal voltage of the solar cell will not fall below the voltage Vt0.

If there has been an extreme fall in insolation of the solar cell, the terminal voltage of the solar cell will become a value close to the voltage Vt0 and only a very small current will be supplied to the battery Ba. Accordingly, although it will take a long time to charge the battery Ba when there has been an extreme fall in insolation of the solar cell, since a balance is achieved between the demanded amount and the supplied amount of power, the terminal voltage of the solar cell will not drop off and take the system 1 out of operation.

As described earlier, since the adjustment of the charging rate by cooperative control is carried out in an extremely short time, by using cooperative control, it is possible to avoid the system 1 going out of operation even when the sky suddenly clouds over and there is a sudden drop in insolation of the solar cell.

Next, changes in the operating point when cooperative control is carried out will be described for a case where the load from the viewpoint of the solar cell has changed.

FIG. 12B is a diagram useful in explaining a change in the operating point when cooperative control is carried out for a case where the load from the viewpoint of the solar cell has increased. In FIG. 12B, the vertical axis represents the terminal current of the solar cell and the horizontal axis represents the terminal voltage of the solar cell. The shaded circles in FIG. 12B express operating points when cooperative control has been carried out.

Here, it is assumed that there is no change in the insolation of the solar cell and that the voltage-current characteristics of the solar cell are expressed by the curve C0 shown in FIG. 12B.

Since it is believed that hardly any power will be consumed immediately after activation of the respective blocks BL, the terminal voltage of the solar cell can be considered to be substantially equal to the open-circuit voltage. Accordingly, the operating point of the solar cell immediately after activation of the respective blocks BL can be considered to be at the point e on the curve C0, for example. Note that the output voltage from the control unit CU1 to the battery unit BU1a can be considered to be 48V, which is the upper limit.

Once the supplying of power to the battery Ba connected to the battery unit BU1a commences, the operating point of the solar cell moves to the point g on the curve C0, for example. Note that since the power necessary for the battery Ba is 100 W in the description of the present embodiment, the area of the region S1 shown by shading in FIG. 12B is equal to 100 W.

When the operating point of the solar cell is at the point g on the curve C0, the power supplied to the battery Ba from the solar cell via the conversion unit 100a and the charging control unit 140 exceeds the necessary power for the battery Ba. Accordingly, the terminal voltage of the solar cell when the operating point of the solar cell is at the point g on the curve C0, the output voltage supplied from the control unit CU1, and the voltage supplied to the battery Ba are respectively just under 100V, 48V, and 42V.

Here, it is assumed that the battery unit BU1b that has the same configuration as the battery unit BU1a is newly connected to the control unit CU1. If it is assumed that in the same way as with the battery Ba connected to the battery unit BU1a, 100 W of power is necessary to charge the battery (referred to out of convenience as the battery Bb) in the battery unit BU1b, the power consumption will increase and the load from the viewpoint of the solar cell will suddenly increase.

In order to supply a total of 200 W to the two batteries, as one example it is necessary to double the total of the output currents to maintain the output voltages from the charging control unit 140 of the battery unit BU1a and the charging control unit 140 of the battery unit BU1b.

However, if the power generating apparatus is a solar cell, since the terminal voltage of the solar cell will fall in keeping with the increase in the output current from the charging control unit 140 included in the battery unit BU1a and the charging control unit 140 included in the battery unit BU1b, compared to when the operating point of the solar cell is at the point g, it is necessary to more than double the total of the output currents. When doing so, as shown in FIG. 12B, it becomes necessary to set the operating point of the solar cell at the point h on the curve C0, for example, so that there is a large fall in the terminal voltage of the solar cell. When there is a large fall in the terminal voltage of the solar cell, there is the risk that the voltage V3 will drop and take the system 1 out of operation.

With cooperative control, if the battery unit BU1b is newly connected and the terminal voltage of the solar cell falls, cooperative control is carried out by the block B11 to adjust the balance between the demanded amount and the supplied amount of power. More specifically, the charging rates of the two batteries are automatically pulled down so that the total of the power supplied to the battery Ba of the battery unit BU1a and the battery Bb of the battery unit BU1b is 150 W, for example.

That is, if the terminal voltage of the solar cell falls due to the battery unit BU1b being newly connected, the output voltage from the control unit CU1 to the battery unit BU1a and the battery unit BU1b also falls. If the terminal voltage of the solar cell approaches Vt0=75V that is the lower limit from 100V, the conversion unit 100a of the control unit CU1 starts to pull down the output voltage to the battery unit BU1a and the battery unit BU1b from 48V to Vb=45V.

If the output voltage from the control unit CU1 to the battery unit BU1a and the battery unit BU1b is pulled down, the input voltages into the battery unit BU1a and the battery unit BU1b also fall. When this happens, the charging control unit 140 provided in the battery unit BU1a and the charging control unit 140 provided in the battery unit BU1b start to pull down the respective output voltages to the battery Ba and the battery Bb. If the output voltages from the respective charging control units 140 are pulled down, the rate of the charging of the battery Ba and the battery Bb is reduced. That is, the charging rates of the respective batteries are pulled down.

Since the overall power consumption will fall if the charging rates of the respective batteries are pulled down, the load from the viewpoint of the solar cell decreases and the terminal voltage of the solar cell increases (recovers) by an amount corresponding to the reduction in the load from the viewpoint of the solar cell.

After this, in the same way as when the insolation of the solar cell suddenly falls, the charging rates are adjusted until the output voltage from the control unit CU1 to the battery unit BU1a and the battery unit BU1b converges on a certain value and a balance is achieved between the demanded amount and the supplied amount of power.

Note that the voltage value that is actually converged upon will differ according to the conditions. For this reason, although the voltage value that is actually converged upon is not clearly known, since charging will stop when the terminal voltage of the solar cell reaches Vt0=75V that is the lower limit, it is estimated that a voltage that is somewhat higher than Vt0 that is the lower limit will be converged upon. Also, since the individual battery units are not controlled in a coordinated manner, it is supposed that even if the battery units have the same configuration, the charging rates of respective battery units will differ according to fluctuations between the elements used. However, this makes no difference in the ability to carry out cooperative control for the entire system.

Since the adjustment of charging rates according to cooperative control is carried out in an extremely short time, if the battery unit BU1b is newly connected, the operating point of the solar cell moves from the point g to the point I on the curve C0. Note that in FIG. 12B, although the point h is illustrated as one example of an operating point of the solar cell on the curve C0 for ease of explanation, the operating point of the solar cell will not actually move to the point h if cooperative control is carried out.

In this way, with cooperative control, in response to an increase in the load from the viewpoint of the solar cell, the charging control units 140 included in the individual battery units BU1 detect the magnitudes of their own input voltages and automatically suppress the currents respectively drawn into such charging control units 140. According to cooperative control, even if the number of battery units BU1 connected to the control unit CU1 increases and the load from the viewpoint of the solar cell suddenly increases, it is possible to avoid the system 1 going out of operation.

Next, changes in the operating point when cooperative control is carried out will be described for a case where both the insolation of the solar cell and the load from the viewpoint of the solar cell have changed.

Figure 13:
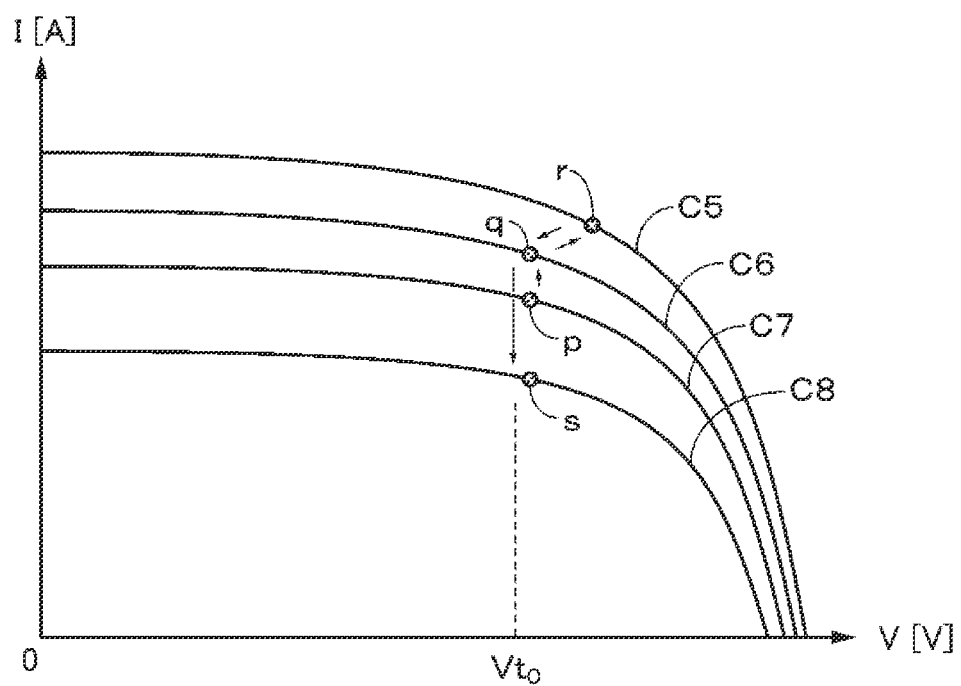
FIG. 13 is a graph useful in explaining changes in operating points when cooperative control is carried out in a case where both insolation of a solar cell and the load from the viewpoint of the solar cell have changed.

FIG. 13 is a diagram useful in explaining changes in the operating point when cooperative control is carried out for a case where both the insolation of the solar cell and the load from the viewpoint of the solar cell have changed. In FIG. 13, the vertical axis represents the terminal current of the solar cell and the horizontal axis represents the terminal voltage of the solar cell. Also, the shaded circles in FIG. 13 indicate operating points for when cooperative control is carried out. The curves C5 to C8 shown in FIG. 13 show voltage-current characteristics of a solar cell for a case where the insolation of the solar cell has changed.

First, assume that the battery unit BU1a equipped with the battery Ba where 100 W of power is necessary for charging is connected to the control unit CU1. It is also assumed that the voltage-current characteristics of the solar cell at this time are expressed by the curve C7 and the operating point of the solar cell is expressed by the point p on the curve C7.

As shown in FIG. 13, it is assumed that the terminal voltage of the solar cell at the point p is very close to the voltage Vt0 set in advance as the lower limit for the output voltage of the solar cell. The terminal voltage of the solar cell being close to the voltage Vt0 means that adjustment of the charging rate according to cooperative control has been carried out and the charging rate has been greatly suppressed. That is, in the state where the operating point of the solar cell is expressed by the point p shown in FIG. 13, the power to be supplied via the charging control unit 140 to the battery Ba greatly exceeds the power supplied from the solar cell to the conversion unit 100a of the control unit CU1. Accordingly, in the state where the operating point of the solar cell is expressed by the point p shown in FIG. 13, a large adjustment is made in the charging rate so that an amount of power far below 100W is supplied to the charging control unit 140 that charges the battery Ba.

Next, assume that the insolation of the solar cell has increased and that the curve showing the voltage-current characteristics of the solar cell has changed from the curve C7 to the curve C6. Assume also that the battery unit BU1b that has the same configuration as the battery unit BU1a has been newly connected to the control unit CU1. At this time, the operating point of the solar cell moves from the point p on the curve C7 o the point q on the curve C6.

When two battery units are connected to the control unit the power consumption of the charging control unit 140 included in the battery unit BU1a and the charging control unit 140 included in the battery unit BU1b when fully charging the battery Ba and the battery Ba is 200 W However, if the insolation of the solar cell is insufficient, cooperative control is continued and the power consumption is adjusted so as to be below 200 W (for example, 150 W).

Next, assume that the sky clears and the curve expressing the voltage-current characteristics of the solar cell changes from the curve C6 to the curve C5. When doing so, if the power generated by the solar cell increases in keeping with the increase in insolation of the solar cell, the output current from the solar cell will increase.

If the insolation of the solar cell increases sufficiently and there is a further increase in the power generated by the solar cell, the terminal voltage of the solar cell will be a value sufficiently higher than the voltage Vt0. If the power supplied to the two batteries of the battery unit BU1a and the battery unit BU1b exceeds the power necessary to charge the two batteries, the (downward) adjustment of the charging rates according to cooperative control is relaxed or is automatically removed.

At this time, the operating point of the solar cell is expressed by the point r on the curve C5, for example, and the charging of the individual batteries Ba and Bb is carried out at a charging rate of 100%.

Next, assume that the insolation of the solar cell has decreased and that the curve expressing the voltage-current characteristics of the solar cell has changed from the curve C5 to the curve C6.

When this happens, as the terminal voltage of the solar cell falls and the terminal voltage of the solar cell approaches the voltage Vt0 set in advance, adjustment of the charging rates according to cooperative control is carried out once again. The operating point of the solar cell at such time is expressed by the point q on the curve C6.

Next, assume that the insolation of the solar cell has decreased further and that the curve expressing the voltage-current characteristics of the solar cell has changed from the curve C6 to the curve C8.

When this happens, since charging rates are adjusted so that the terminal voltage of the solar cell does not fail below the voltage Vt0, the terminal current from the solar cell decreases and the operating point of the solar cell moves from the point q on the curve C6 to the point s on the curve C8.

According to cooperative control, the balance between the demanded amount and the supplied amount of power is adjusted by the control unit CU1 and the individual battery units BU1 so that the input voltage into the individual battery units BU1 does not fall below the voltage Vt0 set in advance. Accordingly, according to cooperative control, it is possible to change the charging rates of the individual batteries B in real time in accordance with the supplying performance of the input side from the viewpoint of the individual battery units BU1. In this way, according to cooperative control, it is possible to cope not only with changes in insolation of the solar cell but also with changes in the load from the viewpoint of the solar cell.

If the output of the solar power generating apparatus 3 is used in other blocks BL, cooperative control is carried out in the same way. In the respective blocks, the balance between the demanded amount and supplied amount of power is adjusted and as a result, the balance between the demanded amount of power and the supplied amount of power is adjusted across the whole system 1. Even if the output from the solar power generating apparatus 3 and the wind power generating apparatus 4 has fallen and/or the load from the viewpoint of the solar power generating apparatus 3 or the like has increased, it is possible to prevent the system 1 from going out of operation.

Not that as described earlier, a voltage corresponding o a predetermined rotational speed of the generator unit included in the wind power generating apparatus 4 may be input into a feedback circuit. By doing so, it is possible to prevent the generator unit from falling below a predetermined speed.

2. Second Embodiment
2-1. Overview of Second Embodiment

A second embodiment of the present disclosure will now be described. The configuration of the system in the second embodiment is the same as the configuration of the system 1 in the first embodiment. The configurations and operations of the control units and the battery units that are included in such system are also the same as in the first embodiment. Duplicated description of features that are the same as in the first embodiment is omitted as appropriate.

A control unit CU2 in a block BL2 includes a conversion unit 200a, a conversion unit 200b, and a conversion unit 200c. A voltage V3 is received by the conversion unit 200a, a voltage V4 is received by the conversion unit 200b, and a voltage V5 is received by the conversion unit 200c. The control unit CU2 includes a CPU and a memory in the same way as the control unit CU1. The CPU included in the control unit CU2 is referred to as the CPU 210 and the memory included in the control unit CU2 is referred to as the memory 211, A control unit CU3 in the block BL3 includes a conversion unit 300a, a conversion unit 300b, and a conversion unit 300c. A voltage V3 is received by the conversion unit 300a, a voltage V4 is received by the conversion unit 300b, and a voltage V5 is received by the conversion unit 300c. The control unit CU3 includes a CPU and a memory in the same way as the control unit CU1. The CPU included in the control unit CU3 is referred to as the CPU 310 and the memory included in the control unit CU3 is referred to as the memory 311.

As described in the first embodiment, by appropriately adjusting the resistance value of the variable resistors provided in the respective conversion units, for example, it is possible to use the output of one of the conversion units with priority, in other words, it is possible to prioritize the output of one out of the output of the solar power generating apparatus 3, the output of the wind power generating apparatus 4, and the output of the biomass power generating apparatus 5 and supply such output to a battery unit BU.

However, in a case where the output of the solar power generating apparatus 3 is used with priority, in the block BL1 it is sufficient to activate only the conversion unit 100a and it is not necessary to activate the conversion unit 100b and the conversion unit 100c. In the second embodiment, as one example a schedule table is used to efficiently control on/off switching of the conversion units of the respective control units CU.

2-2. Schedule Table and Operation Based on Schedule Table

Figure 14:
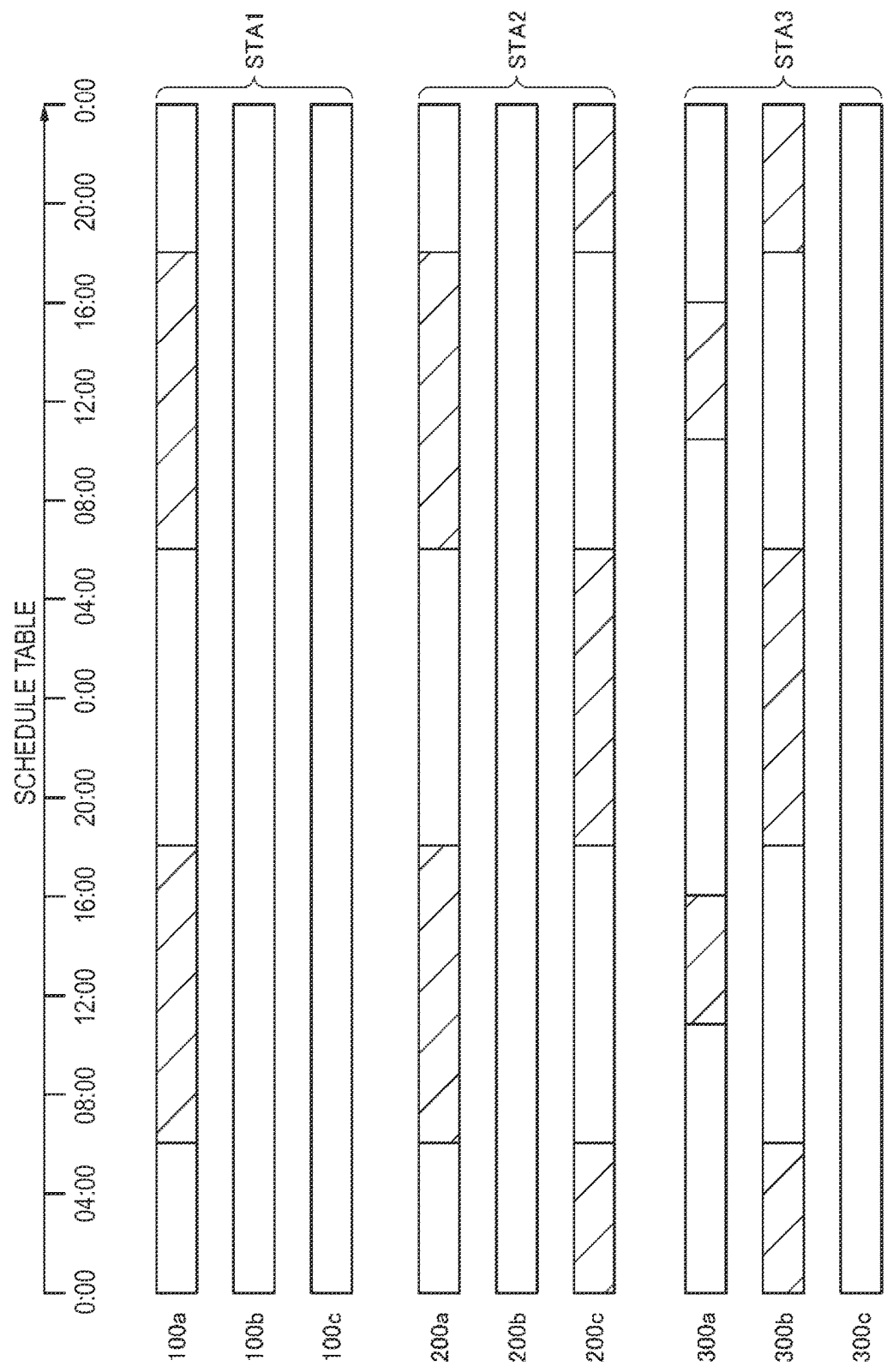
FIG. 14 is a diagram showing one example of schedule tables.

FIG. 14 shows an example of schedule tables for two days. As one example, the schedule tables include a schedule table STA1 for the control unit CU1, a schedule table STA2 for the control unit CU2, and a schedule table STA3 for the control unit CU3. As one example, on/off periods for the respective conversion units are written in the respective schedule tables STA. The electronic switches of the corresponding conversion units are switched on during time periods corresponding to shaded parts in the respective schedule tables STA to activate the conversion units.

The schedule STA1 is stored in the memory 111 included in the control unit CU1. The CPU 110 refers to the schedule table STA1 and carries out control that switches the conversion unit 100a, the conversion unit 100b, and the conversion unit 100c respectively on and off.

In accordance with the schedule table STA1, the CPU 110 switches on the electronic switches (the electronic switch 101c and the electronic switch 101f) of the conversion unit 100a during a daytime period (for example, from six in the morning until six in the evening) when it is expected that the output of the solar power generating apparatus 3 will increase and thereby switches on the conversion unit 100a.

The schedule table STA2 is stored memory 211 included in the control unit CU2. The CPU 210 refers to the schedule table STA2 and controls the on/off switching of the conversion unit 200a, the conversion unit 200b, and the conversion unit 200c.

In accordance with the schedule table STA2, the CPU 210 switches on the electronic switches of the conversion unit 200a during a daytime period (for example, from six in the morning until six in the evening) when it is expected that the output of the solar power generating apparatus 3 will increase and thereby switches on the conversion unit 200a. The CPU 210 switches on the electronic switches of the conversion unit 200c during a nighttime period (for example, from six in the evening until six in the morning) when it is expected that the output of the solar power generating apparatus 3 will be substantially zero and thereby switches on the conversion unit 200c.

The schedule table STA3 is stored in the memory 311 included in the control unit CU3. The CPU 310 refers to the schedule table STA3 and controls the switching on and off of the conversion unit 300a, the conversion unit 300b, and the conversion unit 300c.

In accordance with the schedule table STA3, the CPU 310 switches on the electronic switches of the conversion unit 300a during a time period (for example, from ten in the morning to four in the afternoon) when it is expected that the output from the solar power generating apparatus 3 will increase in particular and thereby switches on the conversion unit 300a. The CPU 310 switches on the electronic switches of the conversion unit 300b during the nighttime period (for example, from six in the evening to six in the morning).

During the day, the conversion units that mainly process the voltage V3 that is the output of the solar power generating apparatus 3 are mainly activated and during the night, the conversion units that mainly process the voltages V4 and the voltage V5 that are the outputs of the wind power generating apparatus 4 and the biomass power generating apparatus 5 are activated. In addition, in a time period (from around noon to evening) when it is expected that the output of the solar power generating apparatus 3 will increase further, the conversion units (the conversion unit 100a, the conversion unit 200a, and the conversion unit 300a) that process the voltage supplied from the solar power generating apparatus 3 are all activated so as to make effective use of the output of the solar power generating apparatus 3. In addition, activation of unnecessary conversion units can be prevented.

Note that the schedule tables STA used in the processing can be updated (or changed) as appropriate. As one example, the respective control units CU store the schedule table STA1, the schedule table STA2, and the schedule table STA3. The CPU 110 controls the switching on and off of the conversion units 100 based on the schedule table STA1 during the first two days, controls the switching on and off of the conversion units 100 based on the schedule table STA2 during the next two days, and controls the switching on and off of the conversion units 100 based on the schedule table STA3 during the following two days.

The CPU 210 controls the switching on and off of the conversion units 200 based on the schedule table STA2 during the first two days, controls the switching on and off of the conversion units 200 based on the schedule table STA3 during the next two days, and controls the switching on and off of the conversion units 200 based on the schedule table STA1 during the following two days.

The CPU 310 controls the switching on and off of the conversion units 300 based on the schedule table STA3 during the first two days, controls the switching on and off of the conversion units 300 based on the schedule table STA1 during the next two days, and controls the switching on and off of the conversion units 300 based on the schedule table STA2 during the following two days, in this way, the control unit CU may store a plurality of schedule tables STA and switch the schedule table STA in use at predetermined intervals (for example, as the seasons change).

The content of the schedule table STA may also change dynamically. For example, information relating to weather conditions (such as sunny, cloudy, rainy, or the arrival of a typhoon) may be acquired by the CPU of the respective control units CU and the schedule tables STA that are referred to may be changed in accordance with the acquired information relating to the weather conditions. Such schedule tables STA are generated for each weather condition.

Figure 15:
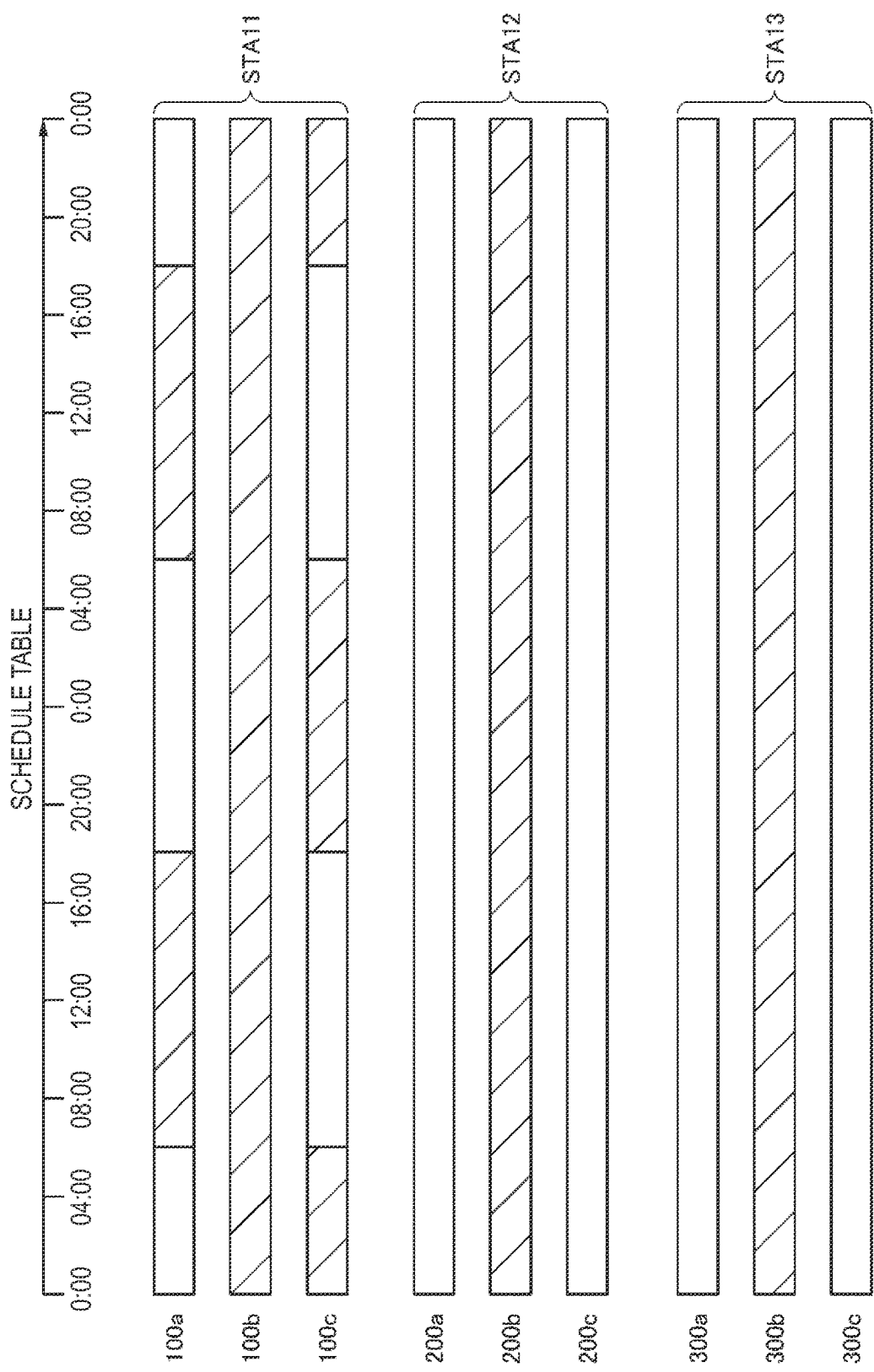
FIG. 15 is a diagram showing another example of schedule tables.

FIG. 15 shows examples of the schedule table STA11, the schedule table STA12, the schedule table STA13 for a case where a typhoon is expected to arrive. The CPU 110 refers to the schedule table STA11 and controls the switching on and off of the conversion units 100. The CPU 210 refers to the schedule table STA12 and controls the switching on and off of the conversion units 200. The CPU 310 refers to the schedule table STA13 and controls the switching on and off of the conversion units 300.

Since the wind can be expected to increase as a typhoon approaches, in all of the schedule table STA11, the schedule table STA12, and the schedule table STA13, the conversion units that process the output of the wind power generating apparatus 4 (that is, the conversion unit 100b, the conversion unit 200b, and the conversion unit 300b) are switched on. In this way, it is possible to change the schedule tables STA that are to be referred to in accordance with the expected weather, for example. The schedule tables STA corresponding to the expected weather may be transmitted from an external server to the respective control units CU. The schedule tables STA may be generated based on statistical data of the region in which the wind power generating apparatus 4 is located (as examples, time periods where the wind is strong and time periods where the wind is weak).

3. Third Embodiment 3-1. Overview of Third Embodiment

A third embodiment of the present disclosure will now be described. The system configuration in the third embodiment is the same as the configuration of the system 1 in the first embodiment. The configurations, operations, and the like of the control unit and the battery units that are included in such system are also the same as in the first embodiment. Duplicated description of features that are the same as in the first embodiment and the second embodiment is omitted as appropriate.

An overview of the third embodiment will now be described. As illustrated in the second embodiment, on/off control of the conversion units 100 is carried out based on the schedule table STA1, on/off control of the conversion units 200 is carried out based on the schedule table STA2, and on/off control of the conversion units 300 is carried out based on the schedule table STA3. For example, the schedule table STA1 and the schedule table STA2 indicate that the conversion unit 100a and the conversion unit 200a are to be activated at six in the morning.

The conversion unit 100a activates the battery units for which charging is necessary (for example, the battery unit BU1a) and charges the battery unit BU1a. The conversion unit 200a activates the battery units for which charging is necessary (for example, the battery unit BU2a) and charges the battery unit BU2a. In particular, when the voltage V3 that is the output of the solar power generating apparatus 3 is low, if a plurality of conversion units were simultaneously activated and a charging process for the battery units connected to the respective conversion units were carried out, there would be the possibility of the voltage V3 falling and the system 1 going out of operation. The third embodiment considers this risk and appropriately controls activation of the conversion units.

3-2. Processing Flow

The processing flow of the third embodiment will now be described. If a plurality of conversion unit that process the output from the same power generating apparatus are to be activated based on the schedule table STA, the CPUs of the respective control units carry out processing that determine whether to actually activate the conversion units at respectively different timing. For example, processing that determines whether to actually activate a conversion unit is carried out according to time division. The timing for carrying out processing that determines whether to actually activate a conversion unit may be written in the schedule tables STA. In the following description, an example is described where activation of the conversion unit 100a and the conversion unit 200a in the same time period is indicated by the schedule table STA.

Figure 16:
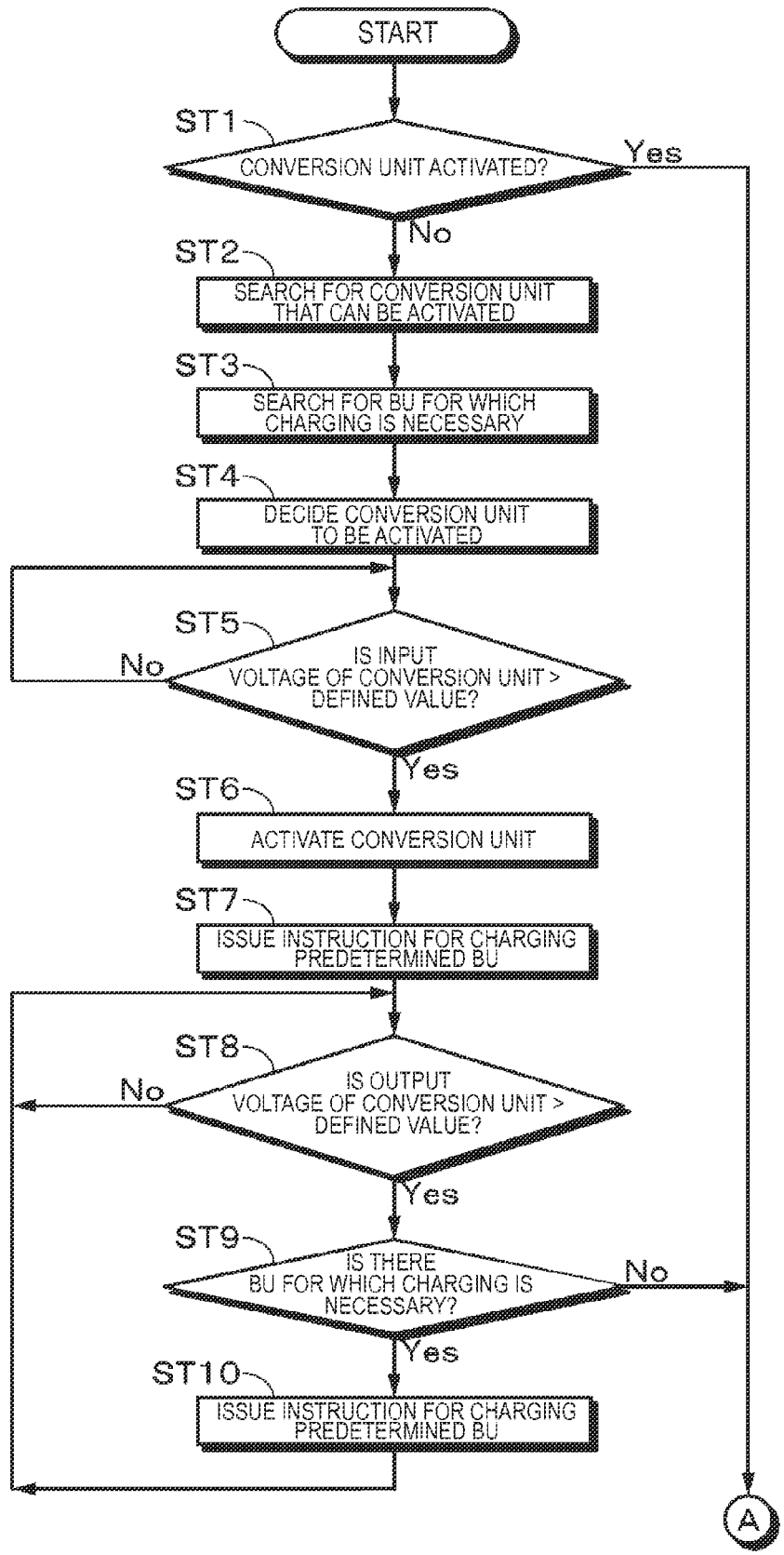
FIG. 16 is a flowchart showing one example of the flow of processing.

FIG. 16 is a flowchart showing an example of the flow of processing in the third embodiment. In step ST1, it is determined whether any of the conversion unit 100a and the conversion unit 200a for which activation is indicated in the schedule table STA has already been activated. In the initial state, since neither of the conversion unit 100a and the conversion unit 200a has been activated, the processing proceeds to step ST2.

The processing that determines whether to carry out activation is carried out first by the control unit CU1. However, such processing may be carried out by the control unit CU2 first. In step ST2, processing that finds conversion units that can be activated is carried out. The expression "conversion units that can be activated" means for example conversion units for which activation is indicated in the schedule table STA. Here, since activation of the conversion unit 100a is indicated by the schedule table STA, the conversion unit 100a is set as a conversion unit that can be activated. The processing then proceeds to step ST3.

In step ST3, the CPU 110 carries out communication with CPUs of the battery units (for example, the battery unit BU1a, the battery unit BU1b, and the battery unit BU1c) connected to the control unit CU1. Through such communication, the CPU 110 acquires information on the battery level of the batteries B included in the respective battery units BU1.

From the acquired information on battery levels, the CPU 110 searches for a battery unit BU1 for which charging is necessary and decides the battery unit to be charged based on the result of the search. As one example, the CPU 110 decides on the battery unit BU1 with the lowest battery level as the battery unit to be charged. Here, an example where the battery unit au a is decided as the battery unit to be charged. The processing then proceeds to step ST4 and the conversion unit 100a is decided as the conversion unit to be activated. Note that if the battery levels of all of the battery units BU1 connected to the control unit CU1 exceed a threshold, the processing by the control unit CU2 described later (the processing indicated as A in FIG. 16) may be carried out. The processing then proceeds to step ST5.

In step ST5, it is determined whether the voltage V3 that is the input voltage into the conversion unit 100a is larger than a defined value. The defined value is the value of a voltage at which it is determined to activate a conversion unit, and as one example is set at 90V. The voltage V3 is acquired by a voltage sensor (for example, the voltage sensor 101b) included in the conversion unit 100a and the acquired sensor information is supplied to the CPU 110. If the result of such determination is that the voltage V3 does not exceed the defined value, the determination process in step ST5 is repeated for a predetermined period. If the voltage V3 does not exceed 90V even if the determination process is repeated for the predetermined period, the processing by the CPU 110 of the control unit CU1 ends and the processing by the CPU 210 of the control unit CU2 is carried out.

If, in step ST5, the voltage V3 exceeds 90V, the processing proceeds to step ST6. In step ST6, the CPU 110 switches on the electronic switch 101c and the electronic switch 101f to activate the conversion unit 100a. At this time, since power is not consumed by the battery unit BU1, the voltage V10 that is the output of the conversion unit 100a is around 48V. After this, the processing proceeds to step ST7.

In step ST7, the CPU 110 transmits a control command indicating a switching on and a start of charging to the CPU 145 of the battery unit BU1a. In keeping with the control command, the CPU 145 activates the charging control unit 140 and charges the battery Ba. After this, the processing proceeds to step ST8.

In step ST8, it is determined whether the voltage V10 that is the output voltage of the conversion unit 100a is larger than a defined value. The defined value is a value showing whether there is a surplus in the supplied amount of power and that charging of another battery unit BU is permitted. The defined value is set at 47V, for example. The voltage V10 is acquired from the voltage sensor 101g, for example.

If the voltage V10 is 47V or below, the processing returns to step ST8. Note that if the voltage V10 does not exceed 47V even if the determination process in step ST8 is repeated for a predetermined period, the processing by the CPU 110 of the control unit CU1 ends and the processing by the CPU 210 of the control unit CU2 is carried out. If the voltage V10 is higher than 47V, the processing proceeds to step ST9.

In step ST9, it is determined whether there is a battery unit aside from the battery unit BU1a for which charging is necessary. As one example, the battery unit with the second lowest battery level is set as a battery unit for which charging is necessary. If, in step ST9, there is a battery unit for which charging is necessary, the processing proceeds to step ST10. In step ST10, in the same way as step ST7, control that charges the battery of the battery unit in question is carried out. In step ST9, if charging is not necessary for any battery unit aside from the battery unit BU1a, the processing proceeds to A. Note that the process marked as A in FIG. 16 merely indicates that the processing continues on to the processing in FIG. 17 described below and does not indicate any particular processing in itself.

Note that it is possible for the processing to proceed to A after step ST8 without the processing in step ST9 being carried out. As one example, the number of battery units that can be charged in each block may be limited to one. Processing may be carried out with consideration to the necessity or urgency of charging carried out for battery units connected to other control units. Here, the method (algorithm) of deciding the battery units to be charged when there is a surplus in the supplied amount of power is written in programs executed by the CPUs of the respective control units.

Figure 17:
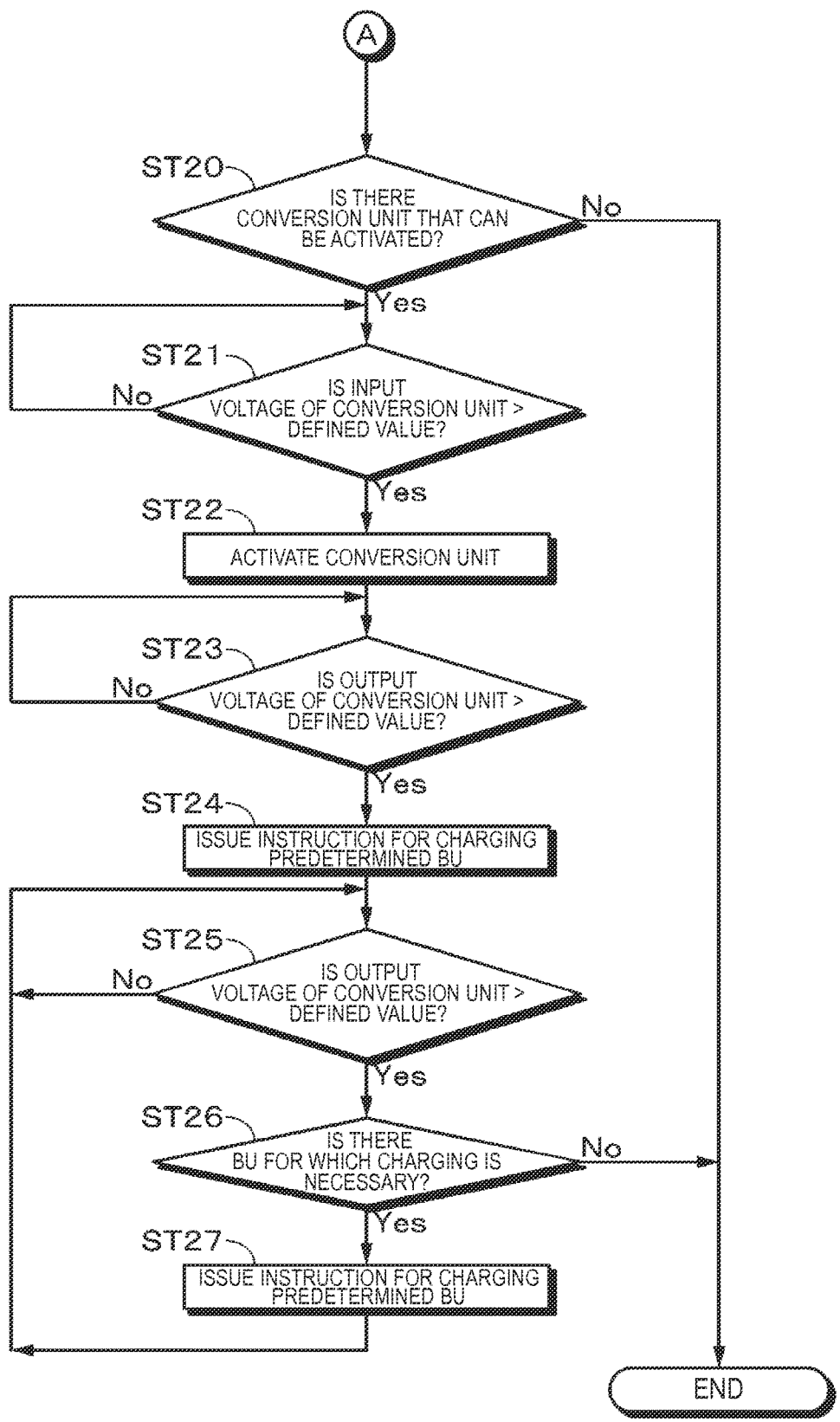
FIG. 17 is a flowchart showing one example of the flow of processing.

FIG. 17 is a flowchart showing the flow of processing following A in FIG. 16. The processing illustrated in FIG. 17 is carried out by the control unit CU2, for example. As described above, the processing that determines whether a conversion unit is actually to be activated is carried out by respective control units CU according to time division, for example. Here, a configuration for carrying out communication and exchanging of information between the respective control units CU does not have to be provided.

In step ST20, processing that searches for a conversion unit that can be activated is carried out. The expression "conversion unit that can be activated" means a conversion unit for which activation is indicated by the schedule table STA, for example. Here, since activation of the conversion unit 200a is indicated by the schedule table STA, the conversion unit 200a is set as a conversion unit that can be activated. The processing then proceeds to step ST21.

In step ST21, it is determined whether the voltage V3 that the input voltage into the conversion unit 200a is larger than a defined value. The defined value is the value of a voltage at which it is determined to activate a conversion unit, and as one example is set at 90V. The voltage V3 is acquired by a voltage sensor included in the conversion unit 200a and the acquired sensor information is supplied to the CPU 210. If the result of such determination is that the voltage V3 does not exceed the defined value, the determination process in step ST21 is repeated for a predetermined period. If the voltage V3 does not exceed 90V even if the determination process is repeated for the predetermined period, the processing ends. That is, if it is determined that the supplying of power is insufficient, the conversion unit 200a is not activated.

If, in step ST21, the voltage V3 exceeds 90V, the processing proceeds to step ST22. In step S122, the CPU 210 switches on the electronic switches included in the conversion unit 200a to activate the conversion unit 200a. The processing then proceeds to step ST23.

In step ST23, it is determined whether the output voltage of the conversion unit 200a is larger than a defined value. The output voltage of the conversion unit 200a is supplied from the conversion unit 200a to the battery unit BU2. Such output voltage of the conversion unit 200a is referred to hereinafter as appropriate as the "voltage V20".

The defined value in step ST23 is a value showing whether there is a surplus in the supplied amount of power and that charging of a battery unit BU is permitted. The defined value is 47V, for example. If the voltage V20 is 47V or below, the processing returns to step ST23. Note that if the voltage V20 does not exceed 47V even if the determination process in step ST23 is repeated for a predetermined period, the processing ends. That is, if it is determined that there is no surplus in the supplied amount of power, control for carrying out charging is not carried out. If the voltage V20 is larger than 47V the processing proceeds to step ST24.

In step ST24, a predetermined battery unit is charged out of the battery units BU2 connected to the control unit CU2. As one example, the battery unit with the lowest battery level out of the battery unit BU2a, the battery unit BU2b, and the battery unit BU2c is decided as the battery unit to be charged. If charging is unnecessary for all of the battery unit BU2a, the battery unit BU2b, and the battery unit BU2c connected to the control unit CU2, the processing ends without charging being carried out.

The CPU 210 of the control unit CU2 carries out control that charges the battery unit to be charged. Since the content of such control is the same as the content of the control in step ST7 and step ST10 described earlier, duplicated description is omitted. After this, the processing proceeds to step ST25.

In the same way as in step ST23, in step ST25 it is determined whether the voltage V20 is larger than 47V. If the voltage V20 is equal to or below 47V, the processing returns to step ST25 and the determination process in step ST25 is repeated. If the voltage V20 does not exceed 47V even when the determination process has been repeated for a predetermined period, the processing ends.

If, in step ST25, the voltage V20 is larger than 47V, the processing proceeds to step ST26. In step ST26, it is determined whether there is a battery unit for which charging is necessary. If there is no battery unit for which charging is necessary, the processing ends. If there is a battery unit for which charging is necessary, the processing proceeds to step ST27 and the processing that charges the battery unit is carried out.

In this way, even if activation of a plurality of conversion units that process the output from the same power generating apparatus is indicated by the schedule table STA, the plurality of conversion units are not simultaneously activated. Processing that determines whether to actually activate the conversion units is carried out and based on the result of such determination, the switching on and off of conversion units is controlled.

By monitoring the output (for example, the voltage V3) from a power generating apparatus, it is possible to determine whether the amount of power supplied to the load is sufficient. Since control to activate the next conversion unit is carried out if the supplied amount of power is sufficient, it is possible to avoid a drop in the output from the power generating apparatus and the system 1 going out of operation.

Figure 18:
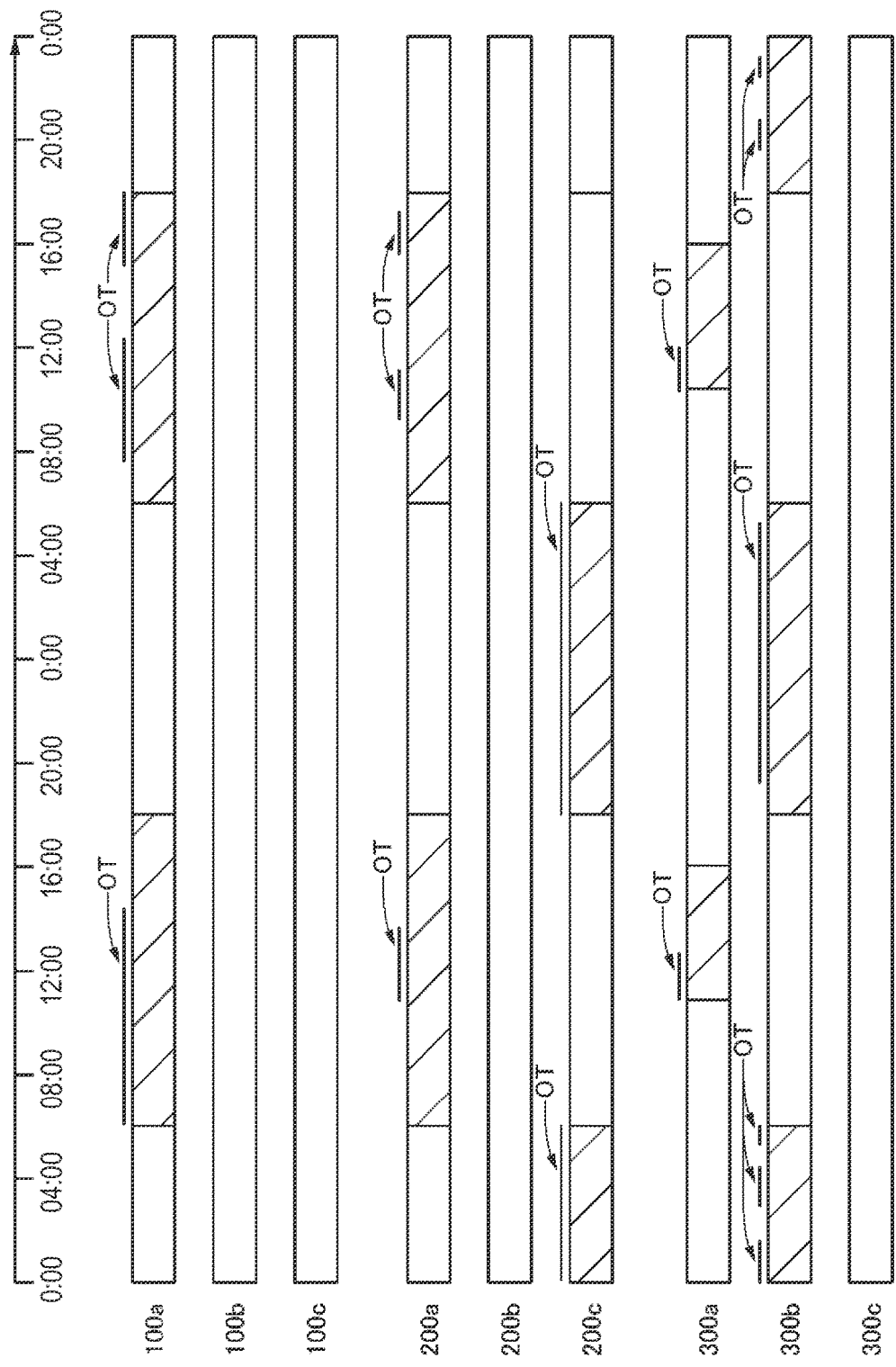

Even if activation of a conversion unit is indicated by the schedule table STA, such conversion unit will not necessarily be activated in reality. FIG. 18 schematically shows times where the respective conversion units are actually activated. The periods where the respective conversion units are actually activated are schematically shown by the reference marks "OT". In this way, the schedule table STA merely indicates whether the activation of a conversion unit is permitted and control over whether such conversion unit is actually activated is carried out as appropriate according to the output of a power generating apparatus.

The third embodiment is not limited to activation using the schedule table STA. In addition, the third embodiment can be modified as described below. For example, the battery unit BU1a is charged according to control by the control unit CU1. As one example, the voltage V3 falls to 90V or below. Since the voltage V3 has fallen to 90V or below, the conversion unit 200a of the control unit CU2 is not activated.

The control unit CU2 acquires the voltage V4 acquired by an electronic switch at the input stage of the conversion unit 200b. If the voltage V4 is larger than 90V, the voltage V4 may be used to charge the battery unit BU2 connected to the control unit CU2. That is, if it has been determined that there is no surplus in the amount of power supplied from a certain power generating apparatus, the conversion units that process power from another power generating apparatus may be activated.

It is also possible to carry out the above determination alternately on the inputs from different power generating apparatuses. As one example, assume that the activation of three conversion units that process the output of the solar power generating apparatus 3 is permitted by the schedule table STA and that the activation of one conversion unit that processes the output of the wind power generating apparatus 4 is permitted. As one example, after it has been determined by the conversion unit 100a of the control unit CU1 whether the voltage V3 is at least 90V, it may then be determined by the conversion unit 200b of the control unit CU2 whether the voltage V4 is at least 90V. The determination by the conversion unit 100a may be carried out at the same time as the determination of the conversion unit 200b. Note that the remaining processing may be carried out in the same way as for the processing described above.

Figure 19:
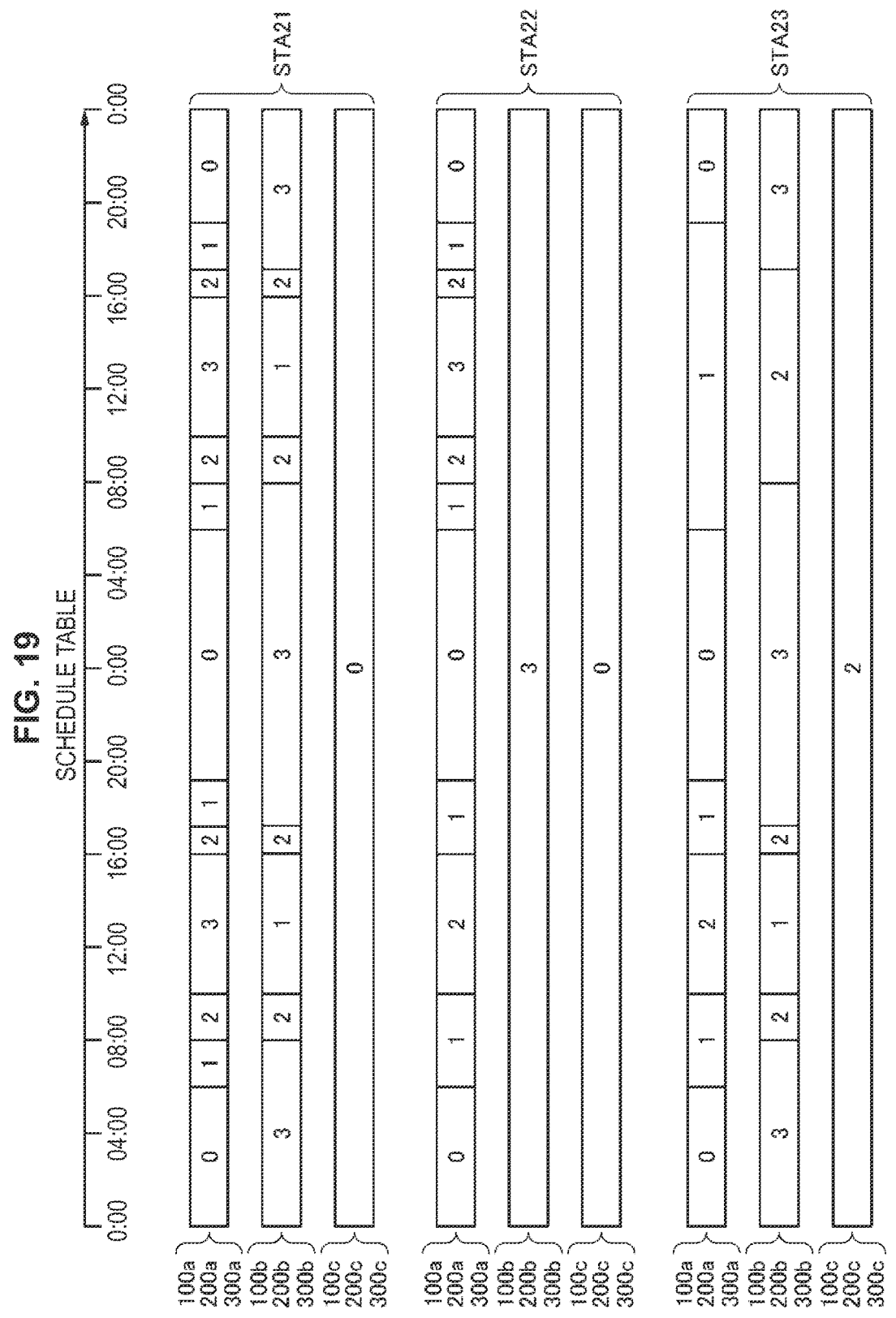

As shown in FIG. 19, the maximum number of conversion units that can be activated may be written in the schedule table STA. The schedule table STA21, the schedule table STA22, and the schedule table STA23 illustrated in FIG. 19 each show a two-day schedule. Normally, the schedule table STA21 is used. If a typhoon arrives on the first day and the weather recovers on the following day, the schedule table STA2 is used. If the weather is cloudy or rainy, for example, the schedule table ST23 is used.

The schedule table STA21 will now be described. The maximum number of conversion units, out of the three conversion units (the conversion unit 100a, the conversion unit 200a, and the conversion unit 300a) that process the output (the voltage V3) from the solar power generating apparatus 3, which can be switched on in the respective time zones is written in the schedule table STA21. The maximum number of conversion units, out of the three conversion units (the conversion unit 100b, the conversion unit 200b, and the conversion unit 300b) that process the output (the voltage V4) from the wind power generating apparatus 4, which can be switched on in the respective time zones is also written in the schedule table STA21. The maximum number of conversion units out of the three conversion units (the conversion unit 100c, the conversion unit 200c, and the conversion unit 300c) that process the output (the voltage V5) from the biomass power generating apparatus 5, which can be switched on in the respective time zones is also written in the schedule table STA21.

The schedule table STA22 will now be described. Before and after a typhoon passes, the wind is very strong. For this reason, the maximum number (for example, 3) is set in the schedule table STA22 so as to make the maximum possible use of conversion units that process the output (the voltage V4) of the wind power generating apparatus 4. In addition, the maximum number is set so that after the typhoon has passed, the conversion units that process the voltage (the voltage V3) of the solar power generating apparatus 3 can be used in the same way as normal.

The schedule table STA23 now be described. On cloudy and rainy days, it is expected that the output (the voltage V3) of the solar power generating apparatus 3 will be low. For this reason, a setting is made so that out of the three conversion units (the conversion unit 100c, the conversion unit 200c, and the conversion unit 300c) that process the output (the voltage V5) from the biomass power generating apparatus 5, a maximum of two conversion units can be switched on and use the voltage V5.

It should be obvious that the numbers indicated by the schedule table STA21, the schedule table STA22, and the schedule table STA23 are the maximum numbers of conversion units that can be switched on and that the number of conversion units that is switched on in reality will not necessarily match such numbers. The number of conversion units that are switched on in reality is appropriately determined in accordance with the output or the like of the respective power generating apparatuses.

Figure 20:
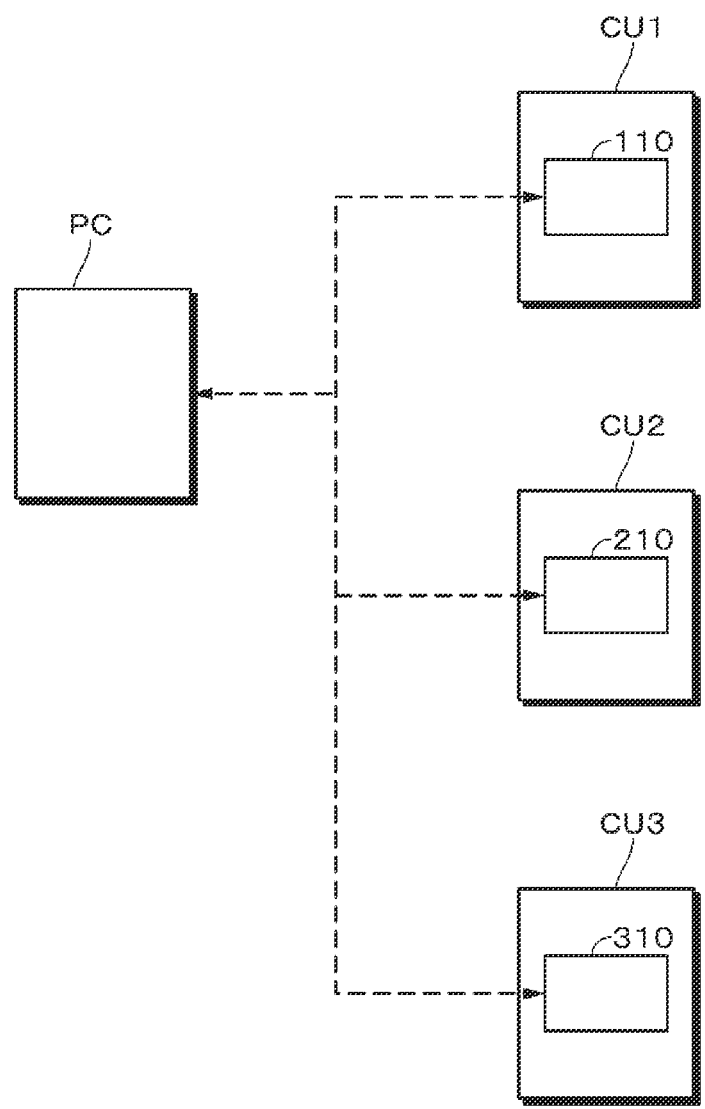
FIG. 20 is a diagram useful in explaining a modification.

Note that although an example where the conversion units 100 acquire the it) values of the input voltages according to time division has been described in the third embodiment, the present disclosure is not limited to such. For example, as shown in FIG. 20, a higher-level controller connected to the respective control unit CU may be provided. The higher-level controller is constructed of a personal computer (PC), for example. Control commands are respectively sent from the personal computer PC to the CPUs (for example, the CPU 110, the CPU 210, and the CPU 310) of the respective control units CU. The CPUs of the respective control units CU may acquire the value of the input voltage (a value acquired by a voltage sensor of a predetermined conversion unit) in accordance with the control command and determine whether the acquired value of the input voltage is larger than 90V.

4. Modifications

Although embodiments of the present disclosure have been described above, the present disclosure is not limited to the above embodiments and can be subjected to various modifications. The configurations, operations, numeric values, and the like in the above embodiments are mere examples and the scope of the present disclosure is not limited to the illustrated configurations and the like.

The present disclosure is not limited to an apparatus and can be realized as a method, a program, and a recording medium.

Note that the configuration and processing according to the above embodiments and modifications can be combined as appropriate within a range where no technical contradictions occur. The order of the processes in the illustrated processing flows may also be changed as appropriate within a range where no technical contradictions occur.

The present disclosure is capable of being applied to a so-called "cloud system" where the illustrated processing is distributed between and carried out by a plurality of apparatuses. The present disclosure can be realized as an apparatus that carries out at least part of the illustrated processing as part of a system that carries out the illustrated processing.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A control system including:

a plurality of first apparatuses; and at least one second apparatus that is connected to each of the plurality of first apparatuses, wherein the plurality of first apparatuses include a plurality of conversion units, and each include a control unit controlling an on/off state of each of the plurality of conversion units by referring to a table, wherein the at least one second apparatus includes a power storage unit and a charging control unit controlling charging of the power storage unit, wherein the plurality of conversion units each convert a first voltage supplied from a power generating apparatus to a second voltage according to a magnitude of the first voltage, wherein the second voltage output from at least one of the plurality of conversion units is supplied to the at least one second apparatus, and wherein the charging control unit controls charging of the power storage unit in accordance with a variation in the second voltage.

(2) The control system according to (1),
wherein an on/off period for each conversion unit is written in the table.

(3) The control system according to (1),
wherein a maximum number of conversion units capable of being activated is written in the table, (4) The control system according to any one of (1) to (3),
wherein the table is capable of being updated.

(5) The control system according to any one of (1) to (4),
wherein the control unit changes the table to be referred to in accordance with a weather condition.

(6) The control system according to any one of (1) to (5),
wherein the plurality of conversion units are each operable to convert the first voltage in a manner that the second voltage increases when the first voltage increases, and are each operable to convert the first voltage in a manner that the second voltage decreases when he first voltage decreases.

(7) The control system according to any one of (1) to (6),
wherein the charging control unit is operable to pull up a charging rate of the power storage unit when the second voltage increases, and is operable to pull down the charging rate of the power storage unit when the second voltage decreases.

(8) A control apparatus including:
a plurality of conversion units; and
a control unit controlling an on/off state of each of the conversion units,
wherein the control unit refers to a table in which an on/off period of each of the plurality of conversion units is written to control the on/off state of each of the plurality of conversion units, and
wherein the conversion unit that is switched on by the control unit converts a first voltage supplied from a power generating apparatus to a second voltage according to a magnitude of the first voltage.

(9) A method for performing control in a control apparatus, the method including:
referring to a table in which an on/off period of a conversion unit is written to control an on/off state of the conversion unit through a control unit; and
converting a first voltage supplied from a power generating apparatus to a second voltage according to a magnitude of the first voltage through the conversion unit that is switched on by the control unit.

The present disclosure contains subject matter related to that disclosed in Japanese Priority Patent Application JP 2012-116901 filed in the Japan Patent Office on May 22, 2012, the entire content of which is hereby incorporated by reference.

What is claimed is:
1. A control system comprising:
a plurality of first apparatuses; and
at least one second apparatus that is connected to each of the plurality of first apparatuses,
wherein the plurality of first apparatuses include a plurality of conversion units, and each conversion unit includes a control unit controlling an on/off state of a respective one of the plurality of conversion units by referring to a schedule table in which on/off periods of the plurality of conversion units are written to control on/off states of the plurality of conversion units,
wherein the at least one second apparatus includes a power storage unit and a charging control unit controlling charging of the power storage unit,
wherein the plurality of conversion units each convert a first voltage supplied from a power generating apparatus to a second voltage according to a magnitude of the first voltage,
wherein the second voltage output from at least one of the plurality of conversion units is supplied to the at least one second apparatus,
wherein information regarding a maximum number of conversion units capable of being activated is stored within the schedule table,
wherein a timing information for carrying out processing that determines whether to activate a conversion unit is stored within the schedule table, and
wherein the charging control unit controls charging of the power storage unit in accordance with a variation in the second voltage.

2. The control system according to claim 1,
wherein the schedule table is capable of being updated.

3. The control system according to claim 1,
wherein the control unit changes the schedule table to be referred to in accordance with a weather condition.

4. The control system according to claim 1,
wherein the plurality of conversion units are each operable to convert the first voltage in a manner that the second voltage increases when the first voltage increases, and are each operable to convert the first voltage in a manner that the second voltage decreases when the first voltage decreases.

5. The control system according to claim 1,
wherein the charging control unit is operable to pull up a charging rate of the power storage unit when the second voltage increases, and is operable to pull down the charging rate of the power storage unit when the second voltage decreases.

6. A control apparatus comprising:
a plurality of conversion units; and
a control unit controlling an on/off state of each of the conversion units,
wherein the control unit refers to a schedule table in which an on/off period of each of the plurality of conversion units is written to control the on/off state of each of the plurality of conversion units,
wherein a maximum number of conversion units capable of being activated is written in the schedule table,
wherein a timing information for carrying out processing that determines whether to activate a conversion unit is stored within the schedule table, and
wherein the conversion unit that is switched on by the control unit converts a first voltage supplied from a power generating apparatus to a second voltage according to a magnitude of the first voltage.

7. A method for performing control in a control apparatus, the method comprising:
referring to a schedule table in which an on/off period of a respective one of a plurality of conversion units is written to control an on/off state of the respective one of the plurality of conversion units through a control unit; and
converting a first voltage supplied from a power generating apparatus to a second voltage according to a magnitude of the first voltage through the conversion unit that is switched on by the control unit,
wherein a maximum number of conversion units capable of being activated is written in the schedule table, and
wherein a timing information for carrying out processing that determines whether to activate a conversion unit is stored within the schedule table.

8. The control system according to claim 1, wherein the first apparatuses are control units and the second apparatuses are battery units.

9. The control system according to claim 1, wherein the schedule table is a time schedule table.

10. The control system according to claim 1, wherein the control unit further controls the on/off state of the respective one of the plurality of conversion units by referring to a plurality of schedule tables.

11. The control system according to claim 1, wherein the control unit further determines whether to activate a conversion unit.

* * * * *